US012682475B2

(12) United States Patent
Zhang et al.

(10) Patent No.: US 12,682,475 B2
(45) Date of Patent: Jul. 14, 2026

(54) LARGE DEPTH-OF-FIELD MICROSCOPIC STRUCTURED-LIGHT 3D IMAGING

(71) Applicant: PURDUE RESEARCH FOUNDATION, West Lafayette, IN (US)

(72) Inventors: Song Zhang, West Lafayette, IN (US); Liming Chen, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 114 days.

(21) Appl. No.: 18/596,251

(22) Filed: Mar. 5, 2024

(65) Prior Publication Data

US 2024/0296577 A1     Sep. 5, 2024

Related U.S. Application Data

(60) Provisional application No. 63/450,047, filed on Mar. 5, 2023.

(51) Int. Cl.
| | |
|---|---|
| *H04N 5/00* | (2011.01) |
| *G01J 9/00* | (2006.01) |
| *G03B 17/54* | (2021.01) |
| *G06K 9/00* | (2022.01) |
| *G06T 7/571* | (2017.01) |
| *G06T 17/00* | (2006.01) |

(Continued)

(52) U.S. Cl.
CPC .............. *G06T 7/571* (2017.01); *G03B 17/54* (2013.01); *G06T 17/00* (2013.01); *H04N*

*23/12* (2023.01); *H04N 23/743* (2023.01); *G06T 2207/10016* (2013.01)

(58) Field of Classification Search
CPC ..................... G06T 7/571; G06T 17/00; G06T 2207/10016; G03B 17/54; H04N 23/12; H04N 23/743
See application file for complete search history.

(56) References Cited

U.S. PATENT DOCUMENTS

| | | | | |
|---|---|---|---|---|
| 9,191,578 | B2 * | 11/2015 | Blayvas | H04N 23/675 |
| 9,292,926 | B1 * | 3/2016 | Tang | H04N 13/128 |
| 10,948,567 | B2 * | 3/2021 | Eberspach | G01S 5/16 |

(Continued)

FOREIGN PATENT DOCUMENTS

| | | | | |
|---|---|---|---|---|
| EP | 4134644 A1 * | 2/2023 | | G06T 7/593 |

OTHER PUBLICATIONS

Agarwala A, Dontcheva M, Agrawala M, Drucker S, Colburn A, Curless B, et al. Interactive digital photomontage. ACM Trans Graph 2004;23:294-302.

(Continued)

*Primary Examiner* — Philip P. Dang
(74) *Attorney, Agent, or Firm* — Quarles & Brady, LLP

(57) ABSTRACT

Systems and methods of large depth-of-field microscopic structured-light 3D imaging include and/or implement capturing a plurality of images of a scene using a plurality of focus settings, each of the plurality of images corresponding to one of the plurality of focus settings, the plurality of images corresponding to a focal stack; processing the plurality of images; merging the plurality of images into an all-in-focus phase map; and reconstructing a 3D shape of the scene based on the all-in-focus phase map.

20 Claims, 22 Drawing Sheets

(51) Int. Cl.
H04N 23/12 (2023.01)
H04N 23/743 (2023.01)

(56) References Cited

U.S. PATENT DOCUMENTS

| 10,955,936 | B2 * | 3/2021 | Send | G01S 5/16 |
| 11,860,292 | B2 * | 1/2024 | Eberspach | G01S 7/4816 |
| 2023/0341328 | A1 * | 10/2023 | Weingarten | G01N 21/6452 |

OTHER PUBLICATIONS

Baker S, Matthews I. Equivalence and efficiency of image alignment algorithms. Proceedings of the 2001 IEEE Computer Society Conference on Computer Vision and Pattern Recognition. 2001, p. I-1090-I-1097.

Boykov Y, Kolmogorov V. An experimental comparison of min-cut/max-flow algorithms for energy minimization in vision. IEEE Transactions on Pattern Analysis and Machine Intelligence 2004;26:1124-37.

Boykov Y, Veksler O, Zabih R. Fast approximate energy minimization via graph cuts. IEEE Transactions on Pattern Analysis and Machine Intelligence 2001;23:1222-39.

Brown LG. A survey of image registration techniques. ACM Comput Surv 1992;24:325-76.

Burt PJ, Kolczynski RJ. Enhanced image capture through fusion. 1993 (4th) International Conference on Computer Vision, 1993, p. 173-82.

Chen et al., "Calibration method for a multi-focus microscopic 3D imaging system," Opt. Lett. 48, 4348-4351 (2023).

Chen et al., "Electrically tunable lens assisted absolute phase unwrapping for large depth-of-field 3D microscopic structured light imaging," Opt. Lasers Eng. 174, 107967 (2024).

Chen et al., "Large depth-of-field microscopic structured light 3D imaging with focus stacking," Opt. Lasers Eng. 167, 107623 (2023).

Chen L, Hu X, Zhang S. Calibration method for an extended depth-of-field microscopic structured light system. Opt Express 2022;30:166-78.

Clark D, Brown B. A Rapid Image Acquisition Method for Focus Stacking in Microscopy. Microscopy Today 2015;23:18-25.

Crete et al., "The blur effect: perception and estimation with a new no reference perceptual blur metric," in Proc. SPIE 6492, Human Vision and Electronic Imaging XII, 649201 (2007).

Fischler MA, Bolles RC. Random sample consensus: a paradigm for model fitting with applications to image analysis and automated cartography. Commun ACM 1981;24:381-95.

Gupta M, Agrawal A, Veeraraghavan A, Narasimhan SG. Structured light 3D scanning in the presence of global illumination. CVPR 2011, 2011, p. 713-20.

Gupta M, Nayar SK. Micro Phase Shifting. 2012 IEEE Conference on Computer Vision and Pattern Recognition, 2012, p. 813-20.

Hartley R, Zisserman A. Multiple View Geometry in Computer Vision. 2nd ed. Cambridge: Cambridge Univ. Press; 2004.

Hasinoff SW, Kutulakos KN, Durand F, Freeman WT. Time-constrained photography. 2009 IEEE 12th International Conference on Computer Vision, 2009, p. 333-40.

Hasinoff SW, Kutulakos KN. Light-Efficient Photography. IEEE Transactions on Pattern Analysis and Machine Intelligence 2011;33:2203-14.

Hu et al., "Large depth-of-field three-dimensional shape measurement with the focal sweep technique" Opt. Express 28, 31197-31208 (2020).

Hu Y, Chen Q, Feng S, Tao T, Asundi A, Zuo C. A new microscopic telecentric stereo vision system—Calibration, rectification, and three-dimensional reconstruction. Opt Lasers Eng 2019;113:14-22.

Hu Y, Chen Q, Feng S, Tao T, Li H, Zuo C. Real-time microscopic 3D shape measurement based on optimized pulse-width-modulation binary fringe projection. Meas Sci Technol 2017;28:075010.

Hu Y, Chen Q, Feng S, Zuo C. Microscopic fringe projection profilometry: A review. Opt Lasers Eng 2020;135:106192.

Kolmogorov V, Zabin R. What energy functions can be minimized via graph cuts? IEEE Transactions on Pattern Analysis and Machine Intelligence 2004;26:147-59.

Korner et al., "One-grating projection for absolute three-dimensional profiling", Opt. Eng. 40(8) 1653-1660 (Aug. 2001).

Kuthirummal et al., "Flexible Depth of Field Photography," IEEE Trans. on Pattern Anal. Mach. Intell. 33, 58-71 (2011).

Li A, Peng X, Yin Y, Liu X, Zhao Q, Körner K, et al. Fringe projection based quantitative 3D microscopy. Optik 2013;124:5052-6.

Li B, Zhang S. Flexible calibration method for microscopic structured light system using telecentric lens. Opt Express 2015;23:25795-803.

Li B, Zhang S. Microscopic structured light 3D profilometry: Binary defocusing technique vs. sinusoidal fringe projection. Opt Lasers Eng 2017;96:117-23.

Li D, Liu C, Tian J. Telecentric 3D profilometry based on phase-shifting fringe projection. Opt Express 2014;22:31826-35.

Li et al., "Novel calibration method for structured-light system with an out-of-focus projector," Appl. Opt. 53, 3415-3426 (2014).

Liu et al., "Calibration method for projector-camera based telecentric fringe projection profilometry system" Opt. Express 25, 31492-31508 (2017).

Liu et al., "Large depth-of-field 3D measurement with a microscopic structured-light system," Opt. Commun. 481, 126540 (2021).

Meng et al., "Large DOF microscopic fringe projection profilometry with a coaxial light-field structure," Opt. Express 30, 8015-8026 (2022).

Peng et al., "Distortion correction for microscopic fringe projection system with Scheimpflug telecentric lens" Appl. Opt. 54, 10055-10062 (2015).

Pertuz S, Puig D, Garcia MA. Analysis of focus measure operators for shape-from-focus. Pattern Recognition 2013;46:1415-32.

Proll et al., "Microscopic three-dimensional topometry with ferroelectric liquid-crystal-on-silicon displays," Appl. Opt. 42, 1773-1778 (2003).

Ramm R, Mozaffari-Afshar M, Hohne D, Hilbert T, Speck H, Kühl S, et al. High-resolution 3D shape measurement with extended depth of field using fast chromatic focus stacking. Opt Express 2022;30:22590-607.

Rao et al., "Flexible calibration method for telecentric fringe projection profilometry systems," Opt. Express 24, 1222-1237 (2016).

Rao L, Da F. Local blur analysis and phase error correction method for fringe projection profilometry systems. Appl Opt 2018;57:4267-76.

Su et al., "Reliability-guided phase unwrapping algorithm: a review," Opt. Lasers Eng. 42, 245-261 (2004).

Suwajanakorn et al., "Depth from focus with your mobile phone," in 2015 IEEE Conference on Computer Vision and Pattern Recognition (CVPR), 3479-3506 (2015).

Szeliski R. Image alignment and stitching: a tutorial. Found Trends Comput Graph Vis 2006;2:1-104.

Van Der Jeught et al., Real-time microscopic phase-shifting profilometry, Applied Optics, vol. 54, No. 15, May 20, 2015, pp. 4953-4959.

Wang et al., "Improved performance of multi-view fringe projection 3D microscopy," Opt. Express 25, 19408-19421 (2017).

Windecker R, Fleischer M, Tiziani HJ. Three-dimensional topometry with stereo microscopes. Opt Eng 1997;36:3372-7.

Yin et al., "Fringe projection 3D microscopy with the general imaging model," Opt. Express 23, 6846-6857 (2015).

Zhang C, Huang PS, Chiang F-P. Microscopic phase-shifting profilometry based on digital micromirror device technology. Appl Opt 2002;41:5896-904.

Zhang et al., "Robust and efficient multi-frequency temporal phase unwrapping: optimal fringe frequency and pattern sequence selection," Opt. Express 25, 20381-20400 (2017).

Zhang S. Absolute phase retrieval methods for digital fringe projection profilometry: A review. Opt Lasers Eng 2018;107:28-37.

Zhang S. High-Speed 3D Imaging with Digital Fringe Projection Techniques. CRC Press; 2018.

Zhong et al., "Autofocusing method for a digital fringe projection system with dual projectors," Opt. Express 28, 12609-12620 (2020).

(56) References Cited

OTHER PUBLICATIONS

Zuo C, Huang L, Zhang M, Chen Q, Asundi A. Temporal phase unwrapping algorithms for fringe projection profilometry: A comparative review. Opt Lasers Eng 2016;85:84-103.

* cited by examiner

LARGE DEPTH-OF-FIELD MICROSCOPIC STRUCTURED-LIGHT 3D IMAGING

CROSS-REFERENCE TO RELATED APPLICATIONS

This application is related to, claims priority to, and incorporates herein by reference for all purposes U.S. Provisional Patent Application No. 63/450,047, filed Mar. 5, 2023.

STATEMENT REGARDING FEDERALLY-SPONSORED RESEARCH OR DEVELOPMENT

This invention was made with government support under U.S. Pat. No. 1,763,689 awarded by the National Science Foundation. The government has certain rights in the invention.

TECHNICAL FIELD

This disclosure relates to the field of microscopy. More particularly, this disclosure relates to systems and methods for microscopic structured-light three-dimensional imaging with a large depth-of-field.

BACKGROUND

Microscopic structured-light (SL) three-dimensional (3D) imaging is an inspection technique used in many applications such as semiconductors and micro-mechatronics, owing to features such as accuracy, speed, flexibility, and cost. Comparative examples of microscopic SL 3D imaging systems typically use lenses with a fixed focal length achieving a limited depth of field (DOF). This limitation becomes more apparent with large system magnifications. Even comparative examples which use telecentric lenses, which can provide a larger DOF than pin-hole lenses under the same magnification, do not have a sufficient DOF for many applications. Other comparative examples of attempts to remedy these limitations, such as the use of cameras set to the Scheimpflug configuration, the use of light-field imaging, or the use of multiple cameras, have resulted in undesirably increased system complexity and reduced system flexibility.

SUMMARY

These and other problems may be overcome by systems, methods, and devices having configurations as set forth herein. Thus, the present disclosure provides systems and methods to increase the DOF of the microscopic 3D imaging by implementing, for example, a focus stacking technique and an associated computational framework.

According to one aspect of the present disclosure, a method of capturing a 3D image is provided. The method comprises capturing a plurality of images of a scene using a plurality of focus settings, each of the plurality of images corresponding to one of the plurality of focus settings, the plurality of images corresponding to a focal stack; processing the plurality of images; merging the plurality of images into an all-in-focus phase map; and reconstructing a 3D shape of the scene based on the all-in-focus phase map.

According to another aspect of the present disclosure, an imaging system is provided. The imaging system comprises a projector configured to emit a projection light; a first optical system configured to direct the projection light from the projector to a stage on which an imaging target is located; an image sensor configured to receive an imaging light; a second optical system configured to direct the imaging light from the stage to the image sensor; and a controller configured to cause the system to perform operations comprising: capturing a plurality of images of the imaging target using a plurality of focus settings, each of the plurality of images corresponding to one of the plurality of focus settings, the plurality of images corresponding to a focal stack, processing the plurality of images, merging the plurality of images into an all-in-focus phase map, and reconstructing a three-dimensional (3D) shape of the imaging target based on the all-in-focus phase map.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be understood that the drawings are not to scale unless otherwise indicated.

DETAILED DESCRIPTION

Figure 1A:
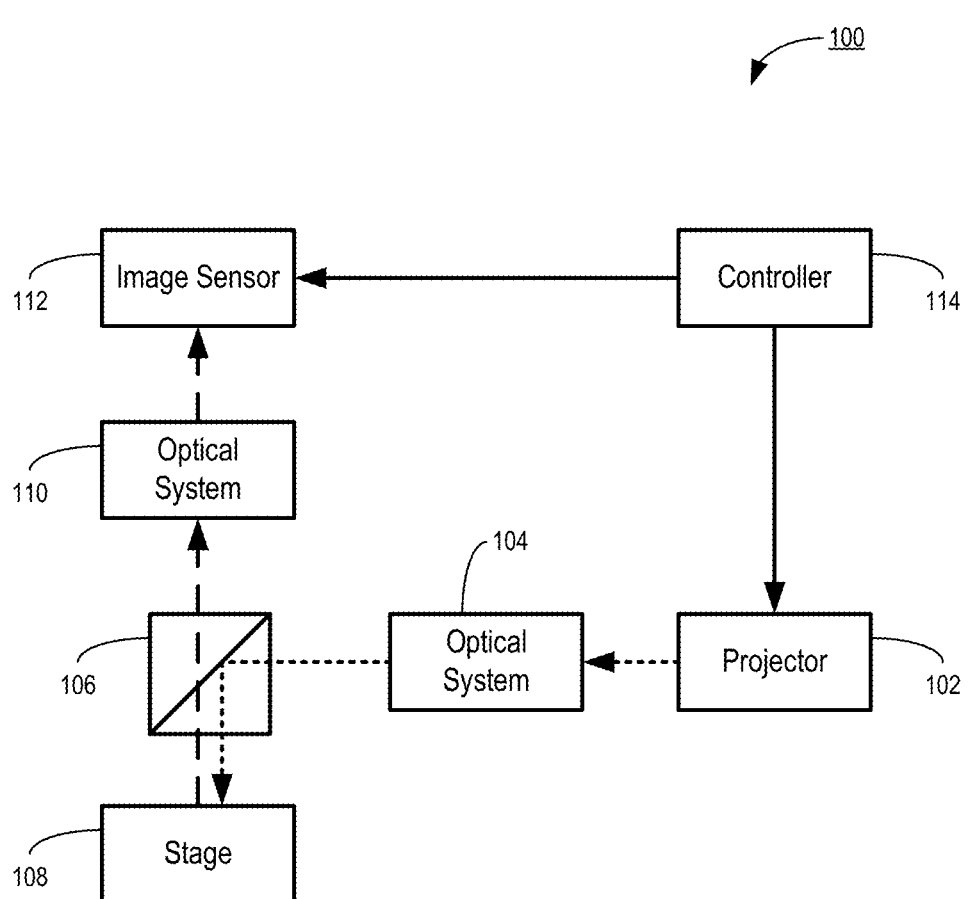
FIG. 1A shows a schematic diagram of an example SL system in accordance with various aspects of the present disclosure.

The detailed description set forth below in connection with the appended drawings is intended as a description of various configurations and is not intended to represent the only configurations in which the subject matter described herein may be practiced. The detailed description includes specific details to provide a thorough understanding of various embodiments of the present disclosure. However, it will be apparent to those skilled in the art that the various features, concepts, and embodiments described herein may be implemented and practiced without these specific details.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration. Moreover, discussion of "horizontal" or "vertical" features may in some implementations be relative to the earth's surface; however, in other implementations a particular component may be installed in a different orientation such that a "horizontal" feature is not necessarily parallel to the earth's surface.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as, e.g., "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as, e.g., "either," "one of," "only one of," or "exactly one of."

As noted above, comparative examples of microscopic SL 3D imaging suffer from insufficiently small DOF, undesirably high system complexity, poor system flexibility, and the like.

The present disclosure provides systems and methods to increase the DOF of microscopic 3D imaging by leveraging a focus stacking technique and computational framework. In some examples, the systems and methods set forth herein operate by first capturing fringe images with various camera focal lengths using a lens, such as an electrically tunable lens (ETL), and aligning the recovered phase maps using phase constraints. Then, the focused pixel phase is extracted using fringe contrast and the phases are stitched into an all-in-focus phase map via energy minimization. Finally, the 3D shape is reconstructed using the all-in-focus phase map. Experimental results show that the systems and methods set forth herein can achieve a large DOF of approximately 2 mm and a field of view (FOV) of approximately 4 mm×3 mm with a pixel size at the object space of approximately 2.6 μm, in some examples. The achieved DOF may be approximately 10× the DOF (or more) of a comparative system or method.

Focal sweep is a computational imaging method based on point-spread-function (PSF) engineering to enlarge the DOF of a camera. The principle of this technique is that when the focus setting (e.g., focal length, image distance, or object distance) of the camera is quickly changed within a range during the camera exposure process, the camera PSF becomes depth-invariant. Under this circumstance, the image formation process can be modeled as a convolution process between an ideal in-focus image with the depth-invariant PSF. Therefore, an in-focus image can be recovered by a deconvolution algorithm. This technique may be implemented with only a single image capture operation to obtain an in-focus image with a larger DOF, thus achieving a high imaging speed. However, the magnification change caused by different focus settings is ignored, and the deconvolution algorithm may be sensitive to noise if focal sweep is used alone.

Another computational imaging method is the focus stacking technique. The focus stacking technique uses a camera to capture a set of images at different focus settings (e.g., focal length, image distance, or object distance), which is called a "focus stack" or "focal stack," and software algorithms to analyze these images to generate an all-in-focus image. The algorithms may include two steps: a first step of image alignment (or image registration) to transform images with different focal settings, because the magnification may vary with different focus settings; and a second step of image stitching to create the all-in-focus image by extracting the pixels with the best focus from the aligned images and combining these pixels into a full image. The focus stacking technique may provide low cost and good performance.

Focus stacking presents some challenges when applied to microscopic SL 3D imaging. For example, microscopic 3D imaging has higher measurement accuracy and resolution requirements compared to 3D imaging, so algorithms developed for 2D imaging generally cannot be applied directly. Additionally, the imaging model of microscopic SL 3D imaging is highly related to the focal length, and thus is sensitive to the focus change.

The present disclosure provides for systems and methods to enlarge the DOF of microscopic 3D imaging using a focus stacking technique. In some implementations, the present disclosure implements focal sweep in addition to focus stacking. In some implementations, the focus stack (and, where implemented, focal sweep) is captured by changing the camera focal length using an ETL or other optical element that allows for capturing multi-focus images without mechanical motion. The basic flow of the focus stacking technique may further be modified to process phase maps in lieu of 2D images for both alignment and stitching. In such examples, fringe images may be captured with different frequencies and phase maps may be computed from these fringe images. One of the lower-frequency phase maps may be used to estimate affine warps that minimize the phase difference between different focus settings. Once the affine warps are determined, they may be applied to the high-frequency fringe images to align the phase maps and fringe contrast maps. The aligned high-frequency fringe contrast maps may be used to measure the focus levels for each pixel and create an all-in-focus high-frequency phase map using the aligned high-frequency phase maps based on the measured focus levels. The all-in-focus high-frequency phase map may then be used to reconstruct the 3D shape of the scene. Because the systems and methods described herein consider the magnification differences among various focus settings, it does not require constant magnification for the hardware design. Thus, it may be applied using microscopic SL systems with pin-hole lenses.

Figure 1B:
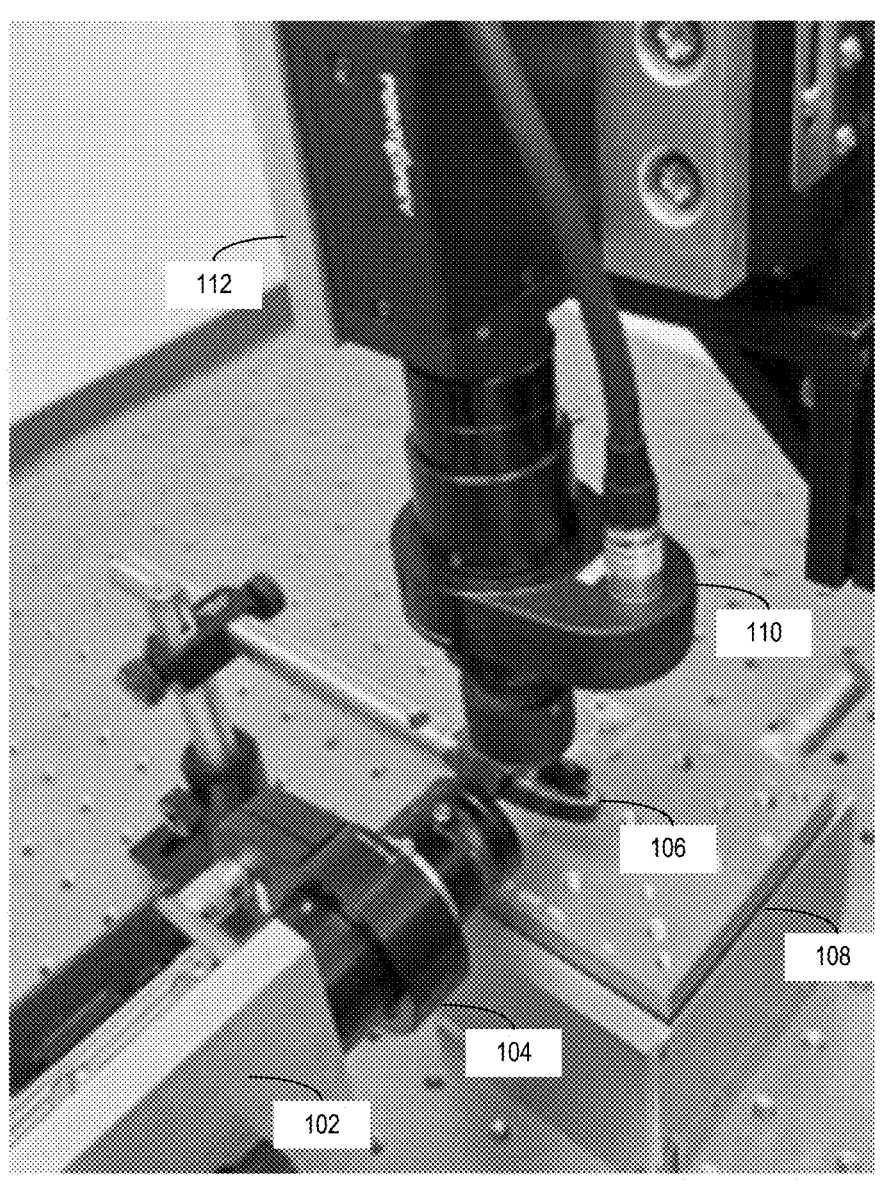
FIG. 1B shows a photograph of an example SL system in accordance with various aspects of the present disclosure.

FIGS. 1A and 1B illustrate examples of a SL system 100 in accordance with the present disclosure, in which FIG. 1A is a schematic diagram and FIG. 1B is a photograph of a prototype. As shown in FIG. 1A, the system 100 may include a projector 102, a first optical system 104, a beam splitter 106, a stage 108 on which an imaging target is located, a second optical system 110, an image sensor 112, and a controller 114. In FIG. 1A, solid lines show the flow of electrical control signals, dotted lines show the optical path of projection light, and dashed lines show the optical path of imaging light. Electrical signals may be transmitted via a wired connection and/or via a wireless connection (e.g., Wi-Fi®, Bluetooth®, etc.).

The projector 102 may be any device configured to emit a projection light, such as a digital-light-processing (DLP) projector. The projector 102 may be operated according to control signals from the controller 114 and/or from another controller (e.g., a controller internal to the projector 102, an external controller, etc.). The first optical system 104 may include lenses (e.g., one or more pin-hole lenses and/or one or more ETLs), polarizers, and the like. If the first optical system 104 includes any active components such as ETLs, the first optical system 104 may be operated according to control signals from the controller 114 and/or from another controller (e.g., a controller internal to the projector 102, an external controller, etc.). The second optical system 110 may include lenses (e.g., one or more pin-hole lenses and/or one or more ETLs), polarizers, and the like. In some implementations, one or more lens components of the second optical system 110 may be reversed to increase image distance. If the second optical system 110 includes any active components such as ETLs, the second optical system 110 may be operated according to control signals from the controller 114 and/or from another controller (e.g., a controller internal to the image sensor 112, an external controller, etc.). The image sensor 112 may be any device configured to detect light signals and convert the light to electrical signals. For example, the image sensor 112 may be a camera that implements a complementary metal-oxide-semiconductor (CMOS) sensor, a charge-coupled device (CCD) sensor, and so on. The image sensor 112 may be operated according to control signals from the controller 114 and/or from another controller (e.g., a controller internal to the image sensor 112, an external controller, etc.). In some implementations, the operation of the image sensor 112 and the projector 102 may be synchronized. While FIG. 1A illustrates the projector 102 and the first optical system 104 as being separate components, and illustrates the image sensor 112 and the second optical system 110 as being separate components, in some implementations the some of the optical components of the first and second optical systems 104, 110 may be integrated with the projector 102 and/or the image sensor 112.

The controller 114 may be any device capable of generating control signals. Thus, the controller 114 may include a processor and a memory. The memory may be a computer-readable medium configured to store instructions that, when executed by the processor, cause the controller 114 to perform certain operations and methods, such as those described herein (see, e.g., FIGS. 2 and 15). In one example, the controller 114 may be a microcontroller unit (MCU), such as an Arduino(R) board, a Raspberry Pi(R) board, and the like.

Focus Stacking

Figure 2:
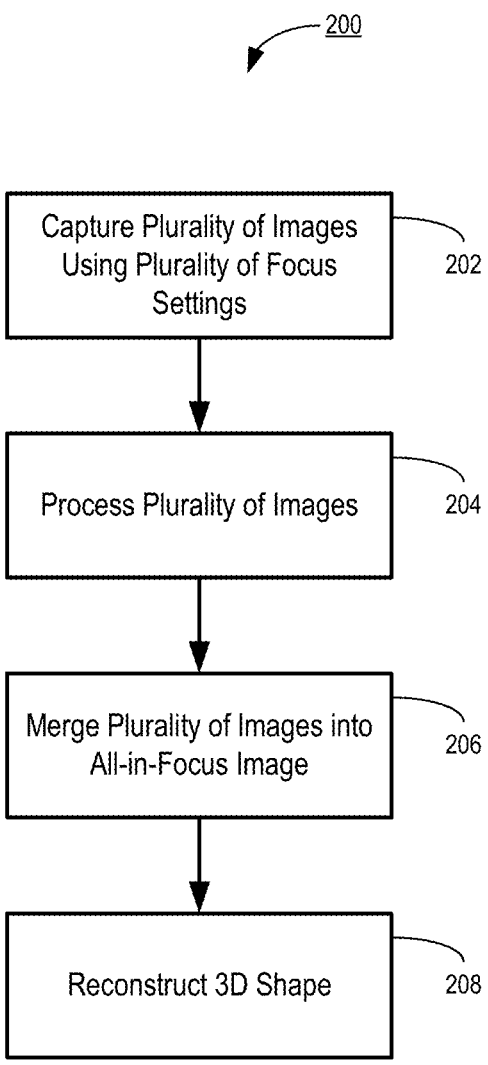
FIG. 2 shows a process flow of an example SL method in accordance with various aspects of the present disclosure.

FIG. 2 illustrates one example of a method 200 of capturing a 3D image. For purposes of illustration and explanation, the method 200 will be described as being performed by the system 100 of FIGS. 1A-1B. For example, the method 200 may be a series of operations performed by the system 100 under the control of the controller 114.

The method 200 begins with operation 202 of capturing a plurality of images using a plurality of focus settings. Each of the plurality of images corresponds to one of the plurality of focus settings. Thus, the plurality of images may be referred to as a focal stack. Operation 202 may include a sub-operation of changing a focal length of a camera (e.g., of the image sensor 112 and/or a component of the second optical system 110, such as an ETL) to capture multi-focus images; and/or a sub-operation of capturing, by the camera (e.g., by the image sensor 112), the plurality of images with different frequencies. The plurality of images may be fringe images.

At operation 204, the method 200 processes the plurality of images. Operation 204 may include a sub-operation of computing a high-frequency phase map and a lower-frequency phase map for respective ones of the plurality of images; a sub-operation of estimating, using the lower-frequency phase map, affine warps that minimize a phase difference between different focus settings of the camera; a sub-operation of applying the affine warps to the high-frequency phase map to generate an aligned fringe contrast map; and a sub-operation of measuring, using the aligned fringe contrast map, a focus level for a plurality of pixels of an image sensor of the camera.

At operation 206, the method 200 merges the plurality of images into an all-in-focus image (e.g., an all-in-focus phase map). Operation 206 may include stitching the high-frequency phase maps for each of the plurality of images into the all-in-focus phase map using the aligned fringe contrast map based on the measured focus levels. Operation 206 may be followed by operation 208 of reconstructing a 3D shape of the scene based on the all-in-focus phase map.

Figure 3:
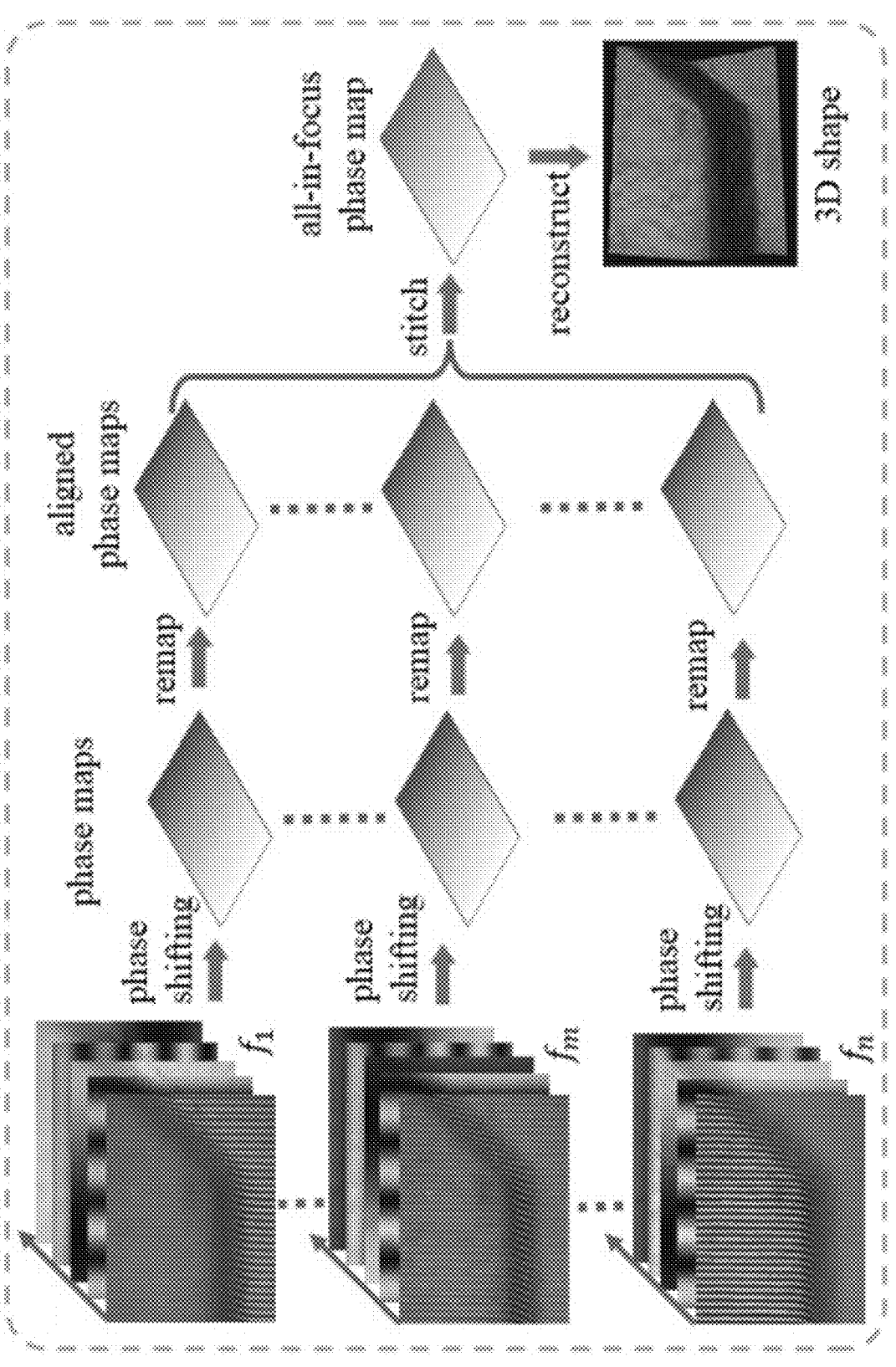
FIG. 3 shows a workflow of an example image analysis method in accordance with various aspects of the present disclosure.

FIG. 3 illustrates an image analysis process (e.g., an example of the operations 204-208). A plurality of images were acquired while changing the camera focal length by moving the focal plane while maintaining the projector's focus. In the image analysis process, first high-frequency phase maps were computed along the vertical direction and lower-frequency phase maps were computed along both horizontal and vertical directions. Then, all high-frequency phase maps were remapped using the affine warps obtained by the lower-frequency phase correspondence. Finally, all high-frequency phase maps were stitched into a single all-in-focus phase map for 3D reconstruction.

The performance of the method 200 was experimentally verified using the prototype system shown in FIG. 1B. The prototype system included a CMOS camera (PointGrey(R) GS3-U3-23S6M) attached with a lens system consisting of a 35 mm fixed aperture (f/1.6) lens (Edmund Optics(R) #85-362), an equivalent 20 mm extension tube, a circular polarizer (Edmund Optics(R) CP42HE), and an ETL (Optotune(R) EL-16-40-TC). The lens was mounted reversely to increase image distance. A DLP projector (Shanghai Yiyi(R) D4500) was equipped with a lens system composed of a 35 mm lens (Fujinon(R) HF35HA-1B), a circular polarizer (Edmund Optics(R) CP42HE), and an ETL (Optotune(R) EL-16-40-TC). Each ETL in the example system was tuned by a lens driver controller (Optotune(R) Lens Driver 4i) within the range of −2 to +3 dpt. A beam splitter (Thorlabs (R) BP145B1) was used to adjust the projector light path. The camera and the projector were synchronized by a microprocessor (Arduino(R) Uno).

For the experimental verification, the camera resolution was set as 1536×1140 pixels and the projector resolution was 912× 1140 pixels. Eleven different focal lengths were used to form the focal stack by changing the camera ETL driving current from −143.00 mA to −113.00 mA with a 3.00 mA incremental step. Hence, the focal stack included 11 focal lengths (i.e., S=11). Without loss of generality, the focal length $f_1$ produced by the −140.00 mA ETL current was set as the template in the alignment process. The projector ETL was held at 20.74 mA during the whole process. The aperture of the projector lens was set as f/5.6 and the camera exposure time as 9.9 ms. Three-frequency fringe images were captured for each focal length with 9, 3, and 3 steps along the vertical direction and two-frequency fringe images were captured with 3 and 3 steps along the horizontal direction. For the vertical direction, the fringe periods were set as 18, 144, and 912 pixels for the three frequencies. For the horizontal direction, the fringe periods were set as 216 and 1140 pixels. The middle-frequency phase maps computed by the fringe images with the period of 144 pixels along the vertical direction and 216 pixels along the horizontal direction were used to compute global warps in the phase map alignment algorithm.

For the phase map alignment, the middle-frequency fringe contrast threshold was set as 0.40 (i.e., $\tau_{mf}=0.40$), the pixel-wise search window size was set as 11×11 pixels (i.e., $r_m=11$), the plane fitting window was set as 11×11 pixels (i.e., w=11), and the reprojection error in the RANSAC (i.e., w=11) was set as 0.3 pixels. A Gaussian filter (size=21×

21 pixels, standard deviation σ=7 pixels) was applied to the middle-frequency phase maps at each focal length before the alignment to reduce the random noise. For the phase map stitching, the weighting constant in the energy minimization was set as 0.25 (i.e., λ=0.25) and the size of the window to compute the weighted-average phase (i.e., $\mathcal{U}$) was set as 21×21 pixels.

Figure 4:
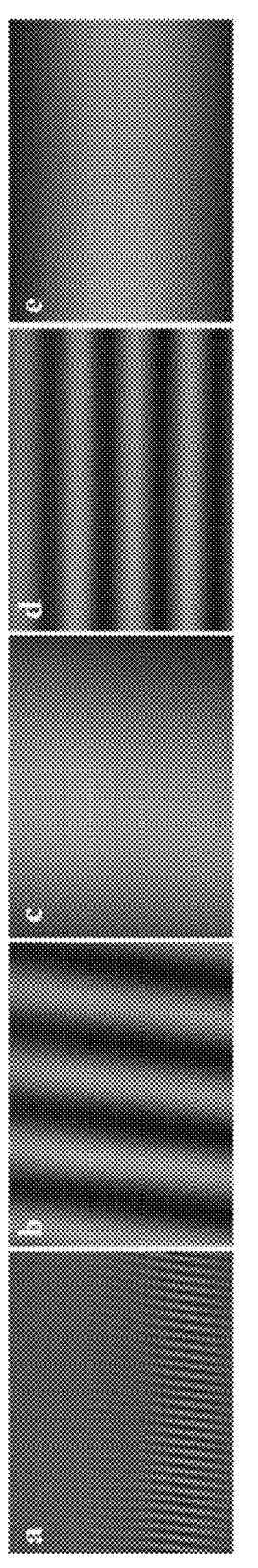
FIG. 4 shows example captured fringe images in accordance with various aspects of the present disclosure.

First, the performance of the method 200 was verified by measuring a white plane. The white plane was tilted to the camera imaging plane, creating a depth of approximately 2 mm, which was approximately 10× the DOF of the system 100 (see FIG. 1B) used to perform the verification. FIG. 4 shows examples of captured fringe images with different frequencies. Image (a) is one of the 9-step high-frequency vertical fringe images with a period of 18 pixels. Image (b) is one of the 3-step middle-frequency vertical fringe images with a period of 144 pixels. Image (c) is one of the 3-step low-frequency vertical fringe images with a period of 912 pixels. Image (d) is one of the 3-step middle-frequency horizontal fringe images with a period of 216 pixels. Image (e) is one of the 3-step low-frequency horizontal fringe images with a period of 1140 pixels. Using fringe images (b) and (d), one can compute middle-frequency wrapped phase maps and the wrapped phase maps can be unwrapped by the phase maps shown in images (c) and (c). The algorithms to compute the wrapped phase map and unwrapped phase map will be described in more detail below. Next, the computed middle-frequency unwrapped phase map was used to run the phase alignment algorithm, which will be described in more detail below.

Figure 5:
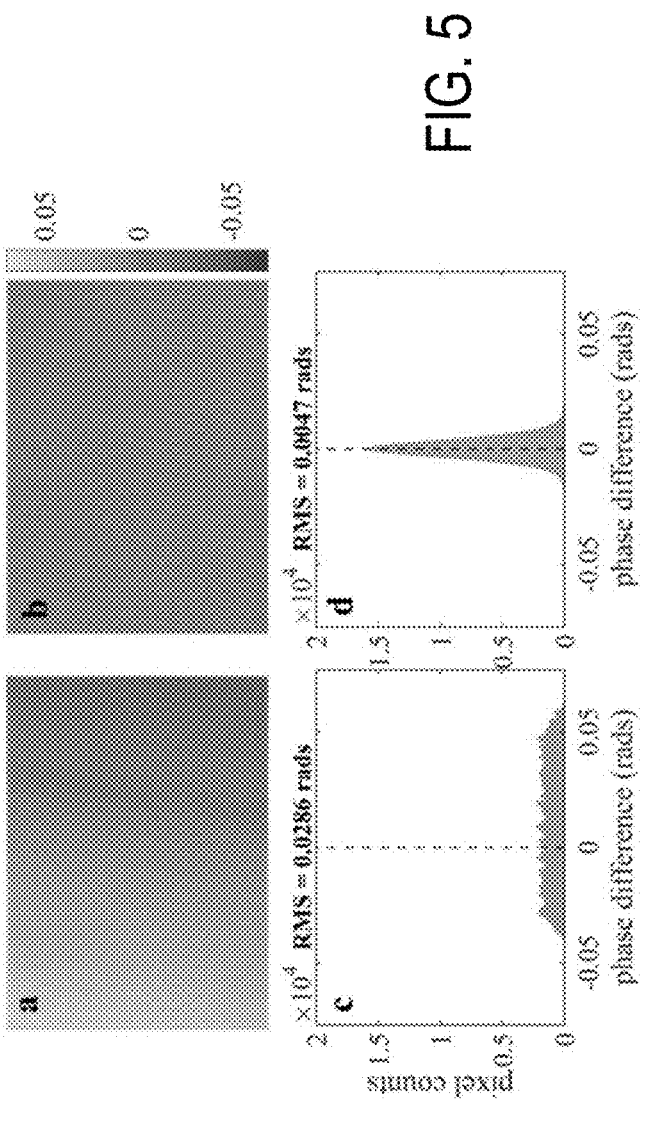
FIG. 5 shows example experimental results of phase map alignment for a white plane in accordance with various aspects of the present disclosure.

FIG. 5, graph (a) shows the difference map between the middle-frequency phase map computed from the middle-frequency vertical fringe images (image (b) of FIG. 4) captured at the focus setting $f_1$ (i.e., ETL current=−140.00 mA) and $f_2$ (i.e., ETL current=−137.00 mA) before alignment. The phase different map clearly shows that they had different magnifications. Next, the phase map alignment algorithm was applied to compute an affine warp for each focus setting, and aligned phase maps were generated. The difference map was computed again using the aligned phase maps under the same focus settings (i.e., $f_1$ and $f_2$) as shown in graph (b) of FIG. 5, which illustrates the phase difference between the middle-frequency unwrapped phase map using the vertical fringe images captured at the focus settings after phase alignment. The difference was greatly reduced, demonstrating that the phase maps were well aligned. Graph (d) shows that the difference distribution after phase map alignment is close to a normal distribution with a root-mean-square (RMS) value of 0.0047 rads. By comparison, graph (c) shows the difference distribution without the phase map alignment, which is not a normal distribution and has a large RMS value of 0.0286 rads.

Figure 6:
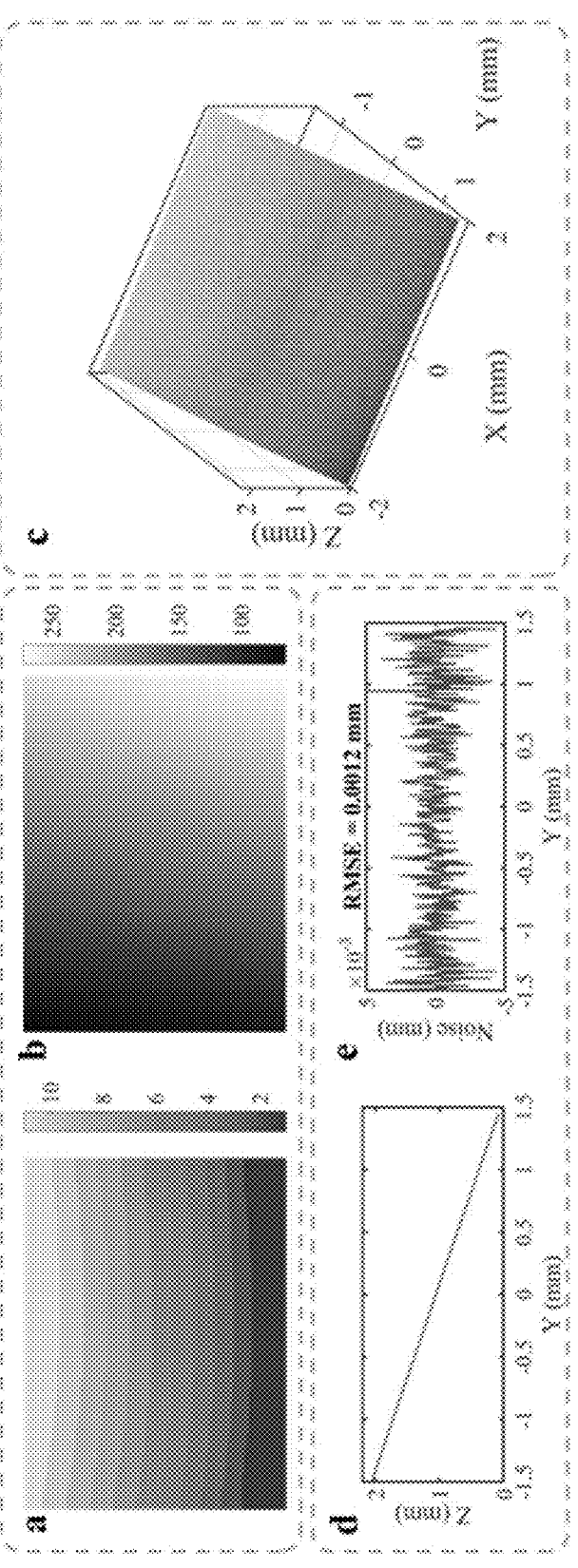
FIG. 6 shows example experimental results for a white plane measurement in accordance with various aspects of the present disclosure.

The same global warps were applied to high-frequency phase maps and fringe contrast maps to align them. The aligned fringe contrast maps were used to generate the index map using the energy minimization algorithm discussed below. FIG. 6 shows experimental results for a white plane measurement. Graph (a) shows the generated index map for phase map switching. Based on the index map, the high-frequency phase maps were stitched using a weighted-average method to create an all-in-focus high-frequency phase map as shown in graph (b). With the all-in-focus high-frequency phase map, the 3D shape of the white plane was reconstructed, as shown in graph (c). This result demonstrated that the plane was reconstructed properly within the depth range of approximately 2 mm. The random noise was also evaluated by analyzing one cross section of the reconstructed 3D shape (the 800th column). Graph (d) shows the cross section. The gross profile of the cross section was then removed to show the random noise. The random noise of the 3D profile is shown in graph (e). The RMS value is approximately 1.2 µm, demonstrating that the method 200 can achieve a high depth resolution within the measurement range of approximately 2 mm.

Figure 7:
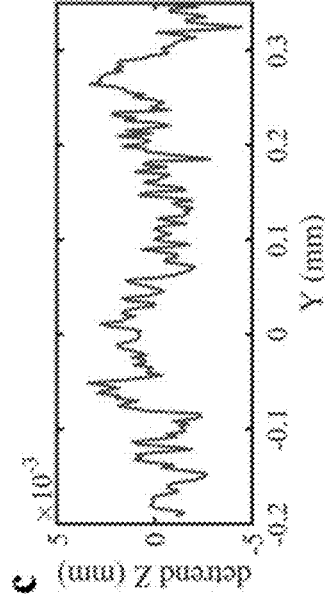
FIG. 7 shows an experimental evaluation of an example stitching method in accordance with various aspects of the present disclosure.
Figure 7:
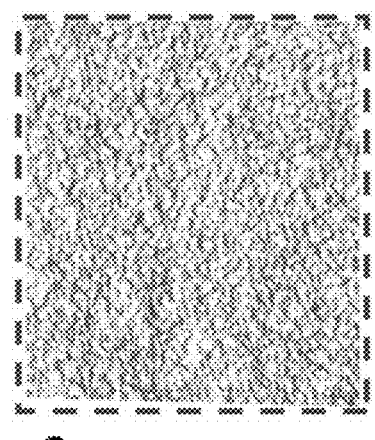
Figure 7:
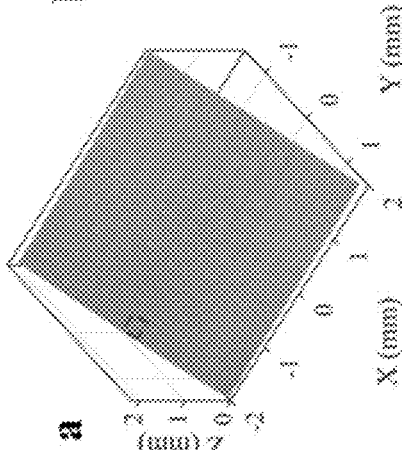

The phase map stitching operation, which will be discussed in more detail below, was also evaluated. FIG. 7 shows an experimental evaluation of the stitching method. Graph (a) shows the reconstructed 3D shape, and graph (b) shows a zoom-in view of a region where the focus setting will change. The 3D shape demonstrated that the reconstructed surface was smooth. This can be further verified by the cross section after detrending the depth along the 150th column (i.e., the center column shown in graph (b)), as shown in graph (c). The detrended cross section shows that the surface roughness was less than 5 µm. Considering the random noise band shown in FIG. 6, graph (c), the roughness was small, demonstrating that the reconstructed surface was smooth.

Figure 8:
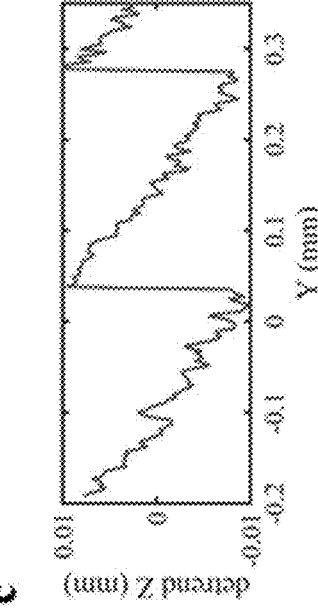
FIG. 8 shows an example 3D reconstruction of a white plane measurement in accordance with a comparative example.
Figure 8:
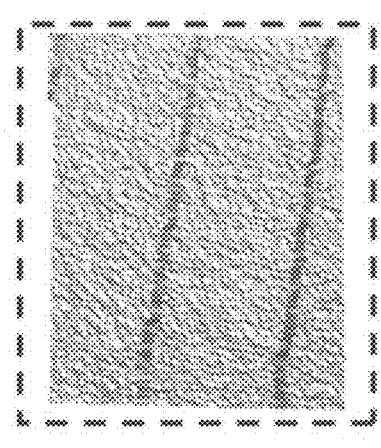
Figure 8:
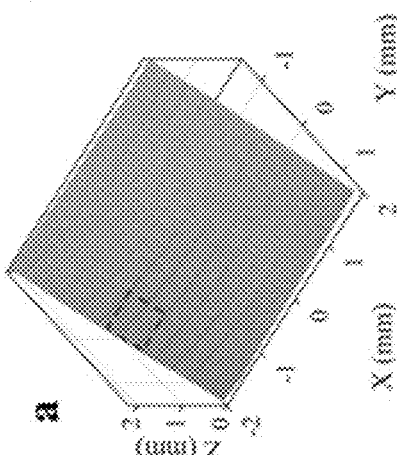

To illustrate that the phase-based image alignment operation of the method 200 provides higher alignment accuracy, the operation of the method 200 was compared to an alignment operation based on a white flat plane measurement using a comparative inverse compositional image alignment (ICIA) algorithm, which is illustrated in FIG. 8. The same images shown analyzed in FIG. 7 were aligned using the ICIA algorithm, and then the aligned images were stitched together using the same stitching algorithm. Graph (a) of FIG. 8 shows the overall 3D reconstruction, graph (b) shows the zoomed-in view, and graph (c) shows the Y-Z profile of one column after removing its gross slope. FIG. 8 shows that the surface is not smooth, demonstrating that the white flat plane was not properly constructed by using the comparative intensity-based image alignment algorithm. This shows that the intensity-based image alignment method could fail without rich textures, whereas the phase-based image alignment method of the method 200 still works well.

Figure 9:
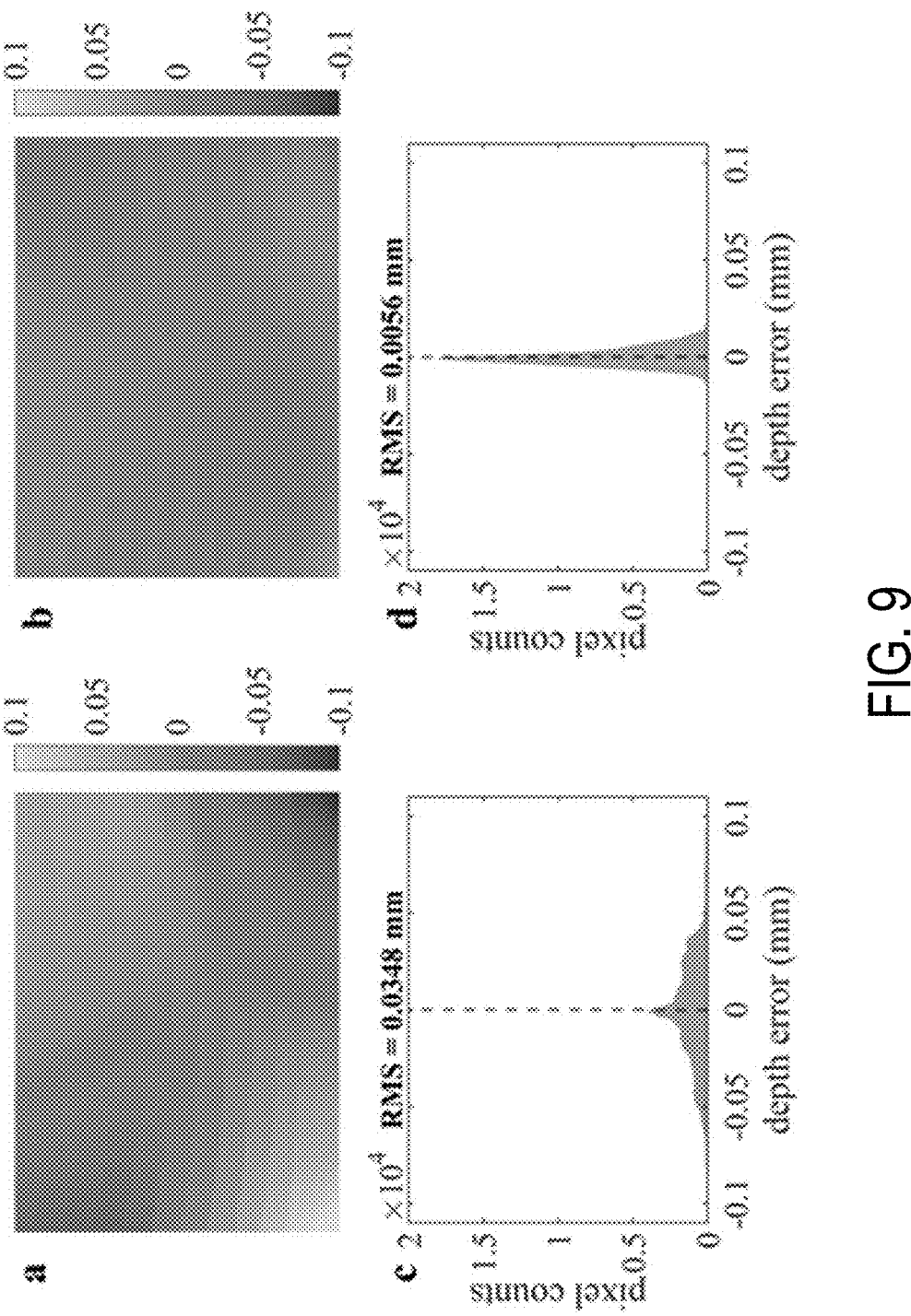
FIG. 9 shows an example plane shape error analysis in accordance with a comparative example.

The overall shape error was also analyzed to further demonstrate the advantages of the phase-based method of the method 200 compared to the intensity-based method. The shape error is computed by the depth difference between the point cloud and its fitted ideal plane. The results shown are shown in FIG. 9. Graph (a) shows the plane measurement error map from the reconstructed result from the ICIA algorithm. Graph (b) shows the plane measurement error map from the reconstructed result using the method 200. Graphs (c) and (d) show the error distribution of graphs (a) and (b), respectively. As can be seen from graph (a), the reconstruction using the ICIA algorithm contains large shape errors. Graph (c) shows that the error distribution has an RMS value of approximately 34.8 µm. In comparison, graph (d) shows that the error distribution is close to a normal distribution, with an RMS value of approximately 5.6 µm. This demonstrates that the method 200 provides better performance.

Figure 10:
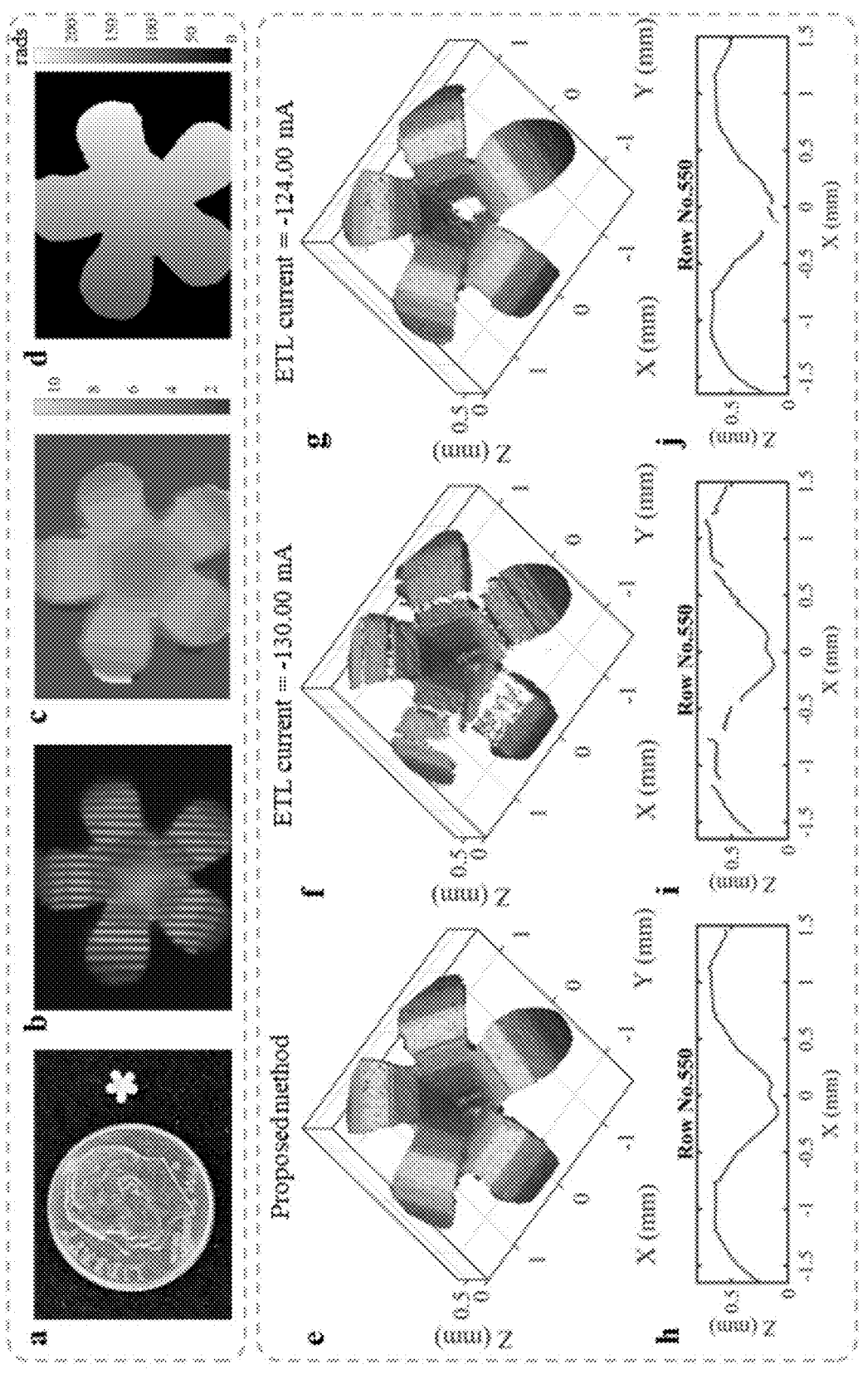
FIG. 10 shows example experimental results for a scene measurement in accordance with various aspects of the present disclosure.

The method 200 was further evaluated by measuring a scene with complex geometry. FIG. 10 illustrates the experimental results of the measurement. Image (a) is a photograph of the sample next to a dime for scale. Image (b) is one of the captured high-frequency fringe images in the focal stack. Image (c) is the generated index map. Image (d) is the stitched all-in-focus high-frequency phase map. Graph (c) is the reconstructed shape using the method 200 (i.e., using the all-in-focus high-frequency phase map of image (d)). Graph (f) shows the reconstructed 3D shape using a single focal length (i.e., ETL current=−130.00 mA). Graph (g) shows the reconstructed shape 3D using another single focal length (i.e., ETL current=−124.00 mA). Graphs (h), (i), and (j) show the cross section along the 550th row of graphs (c), (f), and (g), respectively. Graph (h) demonstrates that the shape of the sample was properly reconstructed using the method 200. In contrast, some parts of the shape cannot be correctly reconstructed using only a single focal length, as demonstrated by graphs (i) and (j). Here, invalid pixels whose high-frequency fringe contrast was less than 0.08 (i.e., γ(x,y)<0.8) were masked out. Graphs (i) and (j) also demonstrate that some pixels were lost after 3D reconstruction due to camera defocus.

Figure 11:
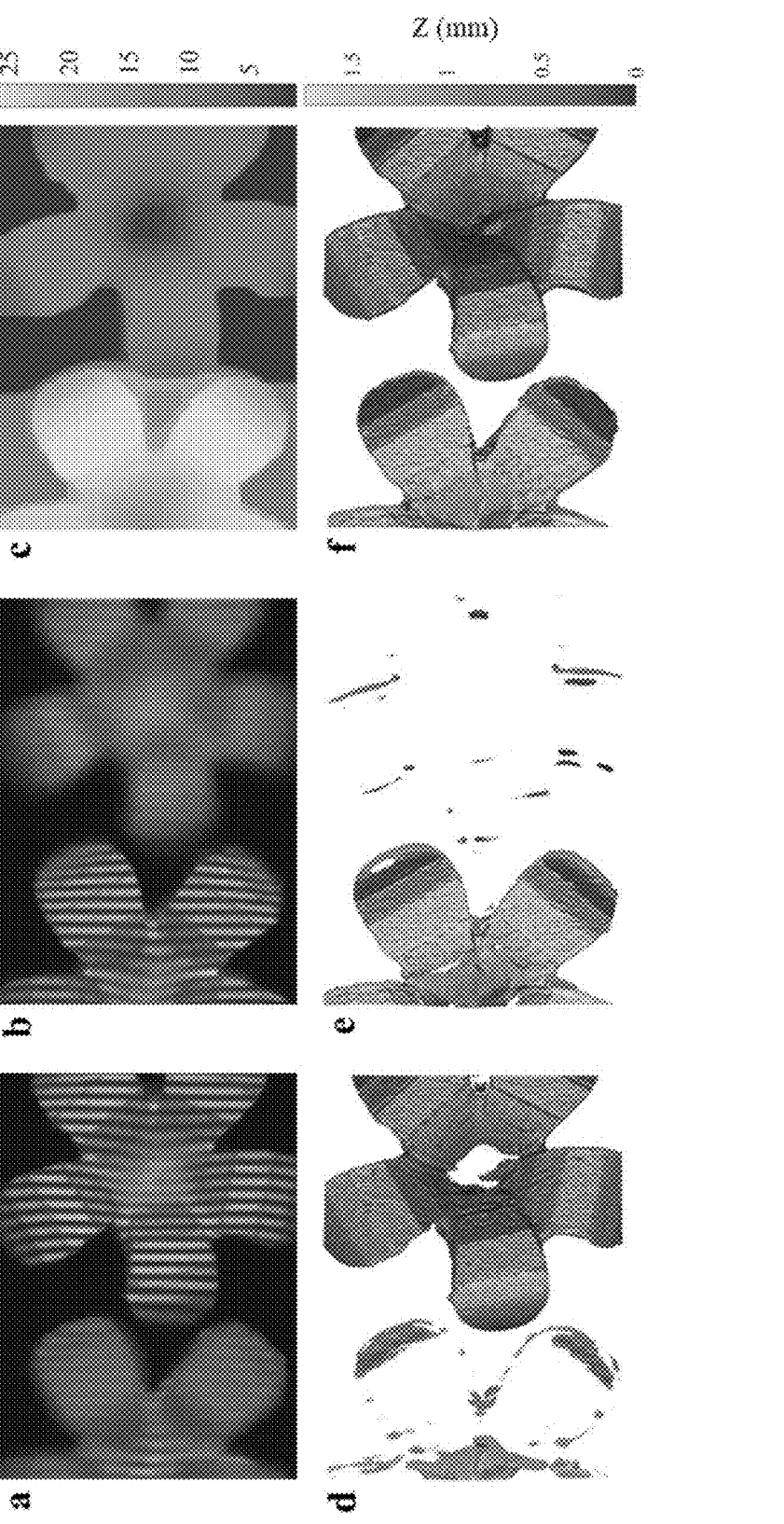
FIG. 11 shows example experimental results for a scene measurement in accordance with various aspects of the present disclosure.

The method 200 was further evaluated using a scene with two samples each similar to the sample of FIG. 10, placed at different depths. In FIG. 11, image (a) is one of the captured high-frequency fringe images at the focus setting $f_3$ (i.e., ETL current=−134.00 mA). Image (b) is one of the captured high-frequency fringe images at the focus setting $f_9$ (i.e., ETL current=−119.00 mA). Image (c) is a index map generated using the method 200. Images (d) and (e) are the reconstructed 3D shapes using the fringe images (a) and (b), respectively, whereas image (f) is the reconstructed 3D shape using the method 200. Images (d) and (e) demonstrate that the system DOF alone was note enough to simultaneously measure both samples, while image (f) shows that the two samples were properly recovered. This demonstrates that the method 200 worked well for the complex scene with a large DOF.

The various algorithms and sub-operations of the method 200 (e.g., the phase-shifting algorithm, the phase map alignment, the sub-pixel correspondence, the affine warp estimation, the aligned phase map generation, the phase map stitching, and the 3D reconstruction) are now described in more detail.

Phase-shifting algorithms are employed in SL systems because of their high accuracy, high resolution, and high speed. The intensity of the k-th fringe pattern can be mathematically described according to the following Equation (1).

$$I_k(x, y) = I'(x, y) + I''(x, y)\cos\left[\phi(x, y) + \frac{2k\pi}{N}\right], k \in [1, N] \tag{1}$$

In Equation (1), I'(x,y) is the DC component representing the background intensity, I'(x,y) is the fringe modulation amplitude, and φ(x,y) is the phase to be solved. If N≥3, then the unknown phase can be computed by the following Equation (2).

$$\phi(x, y) = -\arctan\frac{\sum_{k=1}^{N} I_k(x, y)\sin\left(\frac{2k\pi}{N}\right)}{\sum_{k=1}^{N} I_k(x, y)\cos\left(\frac{2k\pi}{N}\right)} \tag{2}$$

The phase map produced by Equation (2) is wrapped within a range from −π to π with 2π discontinuities due to the nature of the arctangent function. Hence, a temporal, spatial, or alternative phase mapping algorithm may be used to recover a continuous phase map. One example is represented by the following Equation (3).

$$\Phi(x, y) = \phi(x, y) + 2\pi\kappa(x, y) \tag{3}$$

In Equation (3), $\kappa(x,y)$ is an integer number obtained from the phase unwrapping algorithm. In one example of the method 200, a three-frequency phase unwrapping algorithm is adopted. Meanwhile, the DC component $I'(x,y)$ and the fringe modulation $I''(x,y)$ can be computed by the following Equations (4) and (5).

$$I'(x, y) = \frac{1}{N}\sum_{k=1}^{N} I_k(x, y) \tag{4}$$

$$I''(x, y) = \frac{2}{N}\sqrt{\left[\sum_{k=1}^{N} I_k(x, y)\cos\delta_k\right]^2 + \left[\sum_{k=1}^{N} I_k(x, y)\sin\delta_k\right]^2} \tag{5}$$

In Equation (5), $\delta_k$ is defined as $(2 k\pi)/N$. Then, the fringe contrast can be defined as the normalized fringe modulation with the DC component, as given by the following Equation (6).

$$\gamma(x, y) = \frac{I''(x, y)}{I'(x, y)} \tag{6}$$

Because the fringe contrast varies with the blurring effect, it can be used as a focus measure. This will be described in more detail below with regard to the phase map stitching.

The phase map alignment algorithm utilizes the phase maps along the horizontal and the vertical directions obtained by the phase-shifting algorithm described above. With the recovered phase maps, it may be considered that two phase maps may be aligned by remapping each pixel. However, this method assumes that the phase difference is only produced by the magnification change. This assumption is not always valid unless two alignment problems associated with the camera defocus that introduces phase error or completely fails to recover phase are addressed.

The first problem may occur because different levels of camera defocus introduce varying errors to the recovered phase. Due to camera defocus, each camera pixel receives light coming from several neighboring projector pixels. If the object surface reflection varies locally and/or the surface geometric shape changes quickly, the defocus blur brings error to the phase. To alleviate the impact of the phase errors caused by camera defocus, the affine warps may be computed consecutively in the focal stack, i.e., by aligning focus setting $f_n$ to $f_{n+1}$ (or $f_{n-1}$) and adopting the computed affine warps $W_n$ (or $W'_n$) recursively to transform each phase map to the template. The mathematical definition of the affine warp is given below. This process is visualized in FIG. 12, which illustrates the recursive phase alignment method to alleviate the impact of the phase errors caused by camera defocus. The process flow illustrated in FIG. 12 includes computing the global warps consecutively in the focal stack (i.e., compute the affine warps that align the phase map of the focus setting), and then adopting the computed global warps recursively to transform each focus setting to the template. For example, the global warp $W_n W_{n-1}$ is used to align $f_{n-1}$ with $f_{n+1}$. Because the defocus levels of the consecutive focus settings do not change much, this method can greatly reduce the impact of the phase error caused by camera defocus.

Figure 13:
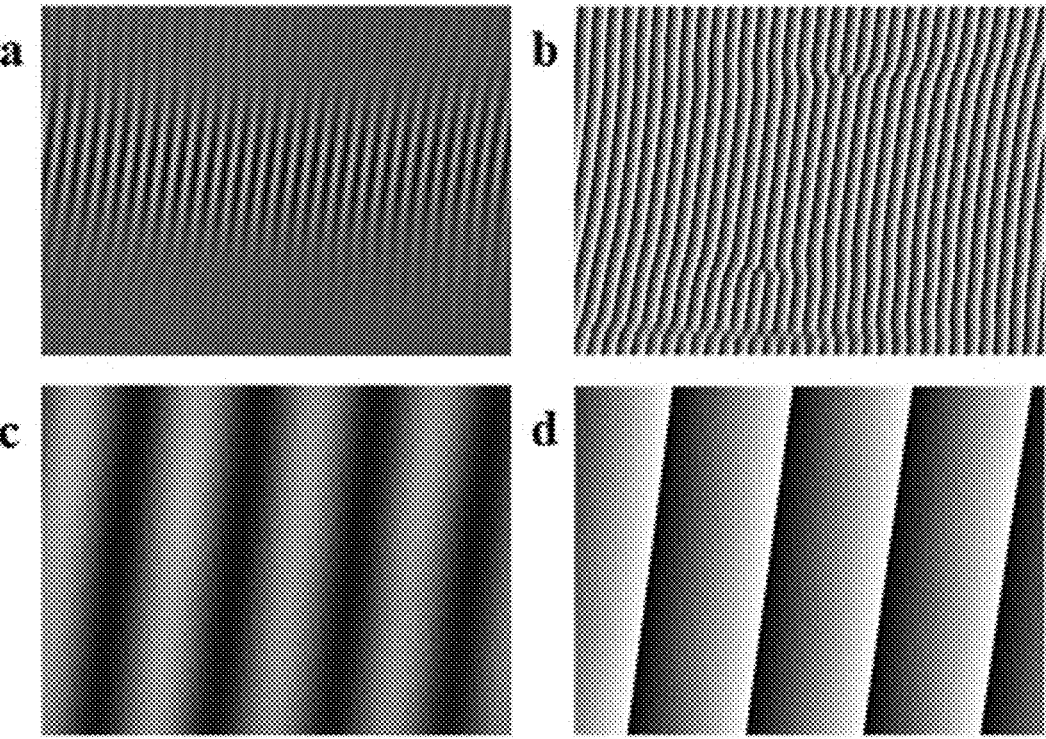
FIG. 13 shows an camera defocus effect on example fringe images in accordance with various aspects of the present disclosure.

The second problem is that, if the camera is defocused so much that all fringes are washed out, it may not be possible to recover phase from fringe patterns. From the Fourier optics, the defocus effect is considered as a low-pass filter (e.g., a Gaussian filter). The signal of the projected fringes may be filtered out if the filter size is too large, and this is more problematic for high-frequency fringes. FIG. 13 provides an illustration. Image (a) shows one of the fringe images of an angled flat plane. This image clearly shows that the fringes at the top and bottom regions nearly disappear due to the defocus effect. Image (b) shows the phase map computed from such high-frequency fringe images. The phase lines are obviously curved, which should not happen because the object is flat. To solve this problem, the global warps are computed using the phase map with a lower frequency. Image (c) shows one of the lower-frequency images under camera defocus, and image (d) shows the phase map computed from such lower-frequency phase maps. From the fringe image and the corresponding wrapped phase map shown in images (c) and (d), it can be seen that the lower-frequency phase is recovered well even at the region the camera is significantly defocused.

After addressing the problems associated with camera defocus, the phase maps between consecutive focus settings can be aligned by a pixel remapping process. Given two focus settings $f_n$ and $f_{n+1}$, and assuming $f_{n+1}$ as the template without loss of generality, the alignment can be mathematically described as a pixel remapping process that seeks to find a solution to the following Equation (7).

$$X_{n+1}, Y_{n+1} = \arg\min_{X_{n+1},Y_{n+1}} \tag{7}$$
$$\left\{\left|\varphi_h^{f_n}(x, y) - \varphi_h^{f_{n+1}}(X_{n+1}, Y_{n+1})\right| + \left|\varphi_v^{f_n}(x, y) - \varphi_v^{f_{n+1}}(X_{n+1}, Y_{n+1})\right|\right\},$$
$$\forall (x, y)$$

In Equation (7), (x,y) represents the original coordinates, $$\varphi_h^{f_n}(x, y) \text{ and } \varphi_v^{f_n}(x, y)$$

are horizontal and vertical unwrapped lower-frequency phase maps under $$f_n, \text{ and } \varphi_h^{f_{n+1}}(x, y) \text{ and } \varphi_v^{f_{n+1}}(x, y)$$

are horizontal and vertical unwrapped lower-frequency phase maps under $f_{n+1}$, and $(X_{n+1}, Y_{n+1})$ are the remapping target for (x, y) that aligns $f_n$ to $f_{n+1}$.

Figure 14:
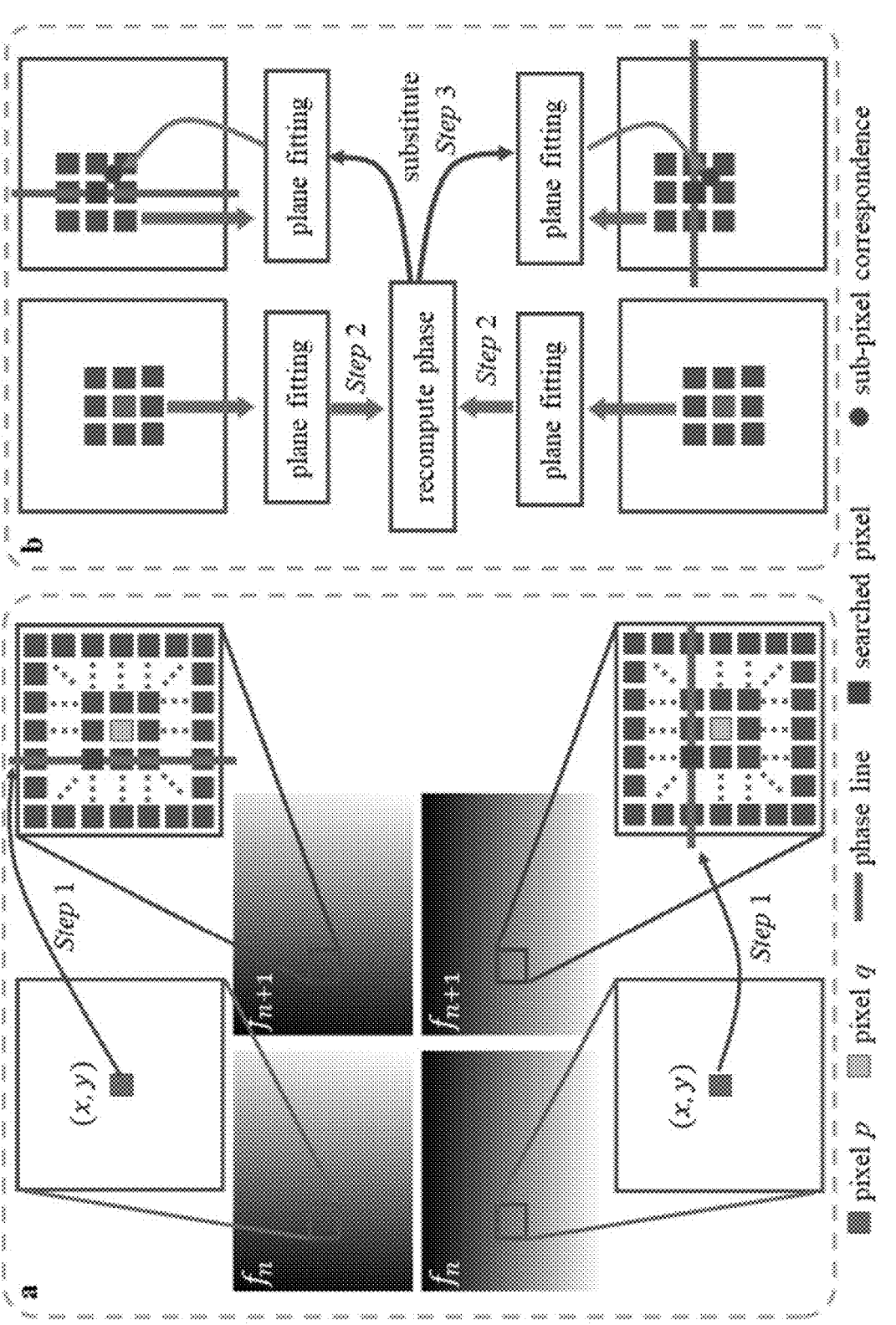
FIG. 14 shows an example sub-pixel correspondence method in accordance with various aspects of the present disclosure.

The remapping pixel coordinates $(X_{n+1}, Y_{n+1})$ for pixel p(x, y) may be found by phase comparison and plane-fitting. This may include a first operation to search a local window at $f_{n+1}$ centered at pixel q, which has the same coordinates (x, y), to find a pixel with a minimum phase difference, which is visualized as image (a) of FIG. 14. In particular, image (a) shows a pixel-wise search, in which for a pixel p in the lower-frequency unwrapped phase map of $f_n$, a window in the lower-frequency unwrapped phase map of $f_{n+1}$ centered at pixel q which has the same coordinates as p is searched. With the horizontal and vertical phase maps, one can uniquely determine a pixel that matches p best. The pixel with the minimum phase difference can be found by a pixel-by-pixel comparison with all pixels in the local window. The phase difference can be computed by the following Equation (8).

$$\Delta\varphi = \left|\varphi_h^{fn}(x, y) - \varphi_h^{fn+1}(X_{n+1}, Y_{n+1})\right| + \left|\varphi_v^{fn}(x, y) - \varphi_v^{fn+1}(X_{n+1}, Y_{n+1})\right|, \quad (8)$$

$$|x' - x| \le \frac{r_m}{2}, |y' - y| \le \frac{r_m}{2}$$

In Equation (8), (x', y') represents the coordinates of the pixel inside the local window at $f_{n+1}$, and $r_m$ represents the size of the local window, which can be set as a constant. Second and third operations are visualized as image (b) of FIG. 14. Image (b) shows a sub-pixel relocation, in which planes for both p and the searched pixel from image (a) are fit using both horizontal and vertical phase maps, and then the phases of p are recomputed. The recomputed phase is then substituted into the fitted planes around the searched pixel, and the sub-pixel location with the minimum phase difference from p may be obtained. Thus, for the pixel p(x, y), two plane functions may be fit within a small pixel window around p(x, y). These may be given by the following Equations (9) and (10), in which Equation (9) uses the horizontal phase map and Equation (10) uses the vertical phase map.

$$\varphi_h^{fn}(u, v) = a_0^{fn} + b_0^{(fn)}u + c_o^{fn}v \quad (9)$$

$$\varphi_v^{fn}(u, v) = a_1^{fn} + b_1^{fn}u + c_1^{fn}v \quad (10)$$

In Equations (9) and (10), (u, v) are coordinates of the neighboring pixels used for plane fittings; and $$a_0^{fn}, b_0^{fn}, c_0^{fn} \text{ and } a_1^{fn}, b_1^{fn}, c_1^{fn}$$

are the coefficients solved by a least-squares method. The window size w may be adjusted according to the noise level. The phase of the pixel p(x, y) may be recomputed using the fitted plane equation, denoted as $$\tilde{\varphi}_h^{fn}(x, y) \text{ and } \tilde{\varphi}_v^{fn}(x, y).$$

The third operation includes fitting planes using the same method as the second operation for the matched pixel (x', y') at $f_{n+1}$ to obtain coefficients $$a_0^{fn+1} \text{ to } c_1^{fn+1}.$$

Within the fitted planes, the sub-pixel correspondence is relocated using the recomputed phase values given by the following Equations (11) and (12).

$$x'' = \frac{c_1^{fn+1}\left[\tilde{\varphi}_h^{fn}(x, y) - a_0^{fn+1}\right] - c_0^{fn+1}\left[\tilde{\varphi}_v^{fn}(x, y) - a_1^{fn+1}\right]}{c_1^{fn+1}b_0^{fn+1} - c_0^{fn+1}b_1^{fn+1}} \quad (11)$$

$$y'' = \frac{b_1^{fn+1}\left[\tilde{\varphi}_h^{fn}(x, y) - a_0^{fn+1}\right] - b_0^{fn+1}\left[\tilde{\varphi}_v^{fn}(x, y) - a_1^{fn+1}\right]}{b_1^{fn+1}c_0^{fn+1} - b_0^{fn+1}c_1^{fn+1}} \quad (12)$$

The whole phase map can be aligned by running the same sub-pixel correspondence for every pixel. However, the computation complexity will be very high since four plane fittings are needed for each pixel. To simplify the algorithm, the pixel remapping function may be modeled as an affine warp. Here, non-linear deformations caused by inconsistent lens distortions may be ignored because the experimental results described above demonstrated that the inconsistent lens distortion is very small. Specifically, the phase map at $f_n$ is down-sampled and only the sub-pixel correspondences for the sampled pixels of $f_n$ are computed. Invalid pixels are masked out using the lower-frequency fringe contrast. Based on these sub-pixel correspondences, an affine warp is estimated according to the following Equation (13).

$$\begin{bmatrix} u' \\ v' \\ 1 \end{bmatrix} = \begin{bmatrix} p_1 & p_2 & p_3 \\ p_4 & p_5 & p_6 \\ 0 & 0 & 1 \end{bmatrix}\begin{bmatrix} u \\ v \\ 1 \end{bmatrix} \quad (13)$$

In Equation (13), vector $[u', v', 1]^T$ represents the homogeneous pixel coordinates after the transformation; the entries p1 through p6 are parameters of the affine transformation; vector $[u, v, 1]^T$ denotes the original homogeneous pixel coordinates; and superscript T is the matrix transpose operator. These parameters can be solved by the least-squares method. However, the sub-pixel correspondence could, unless addressed, still contain incorrect mappings, especially around sharp discontinuities. To address this, the RANSAC algorithm may be employed in this least-squares to get the best estimation. With the affine warp, the remapping can be computed according to the following Equation (14).

$$[X_{n+1}, Y_{n+1}, 1]^T = W_n[x, y, 1]^T \quad (14)$$

In Equation (14), the warp $W_n$ may be given by the following Equation (15).

$$W_n = \begin{bmatrix} p_1 & p_2 & p_3 \\ p_4 & p_5 & p_6 \\ 0 & 0 & 1 \end{bmatrix} \quad (15)$$

Figure 12:
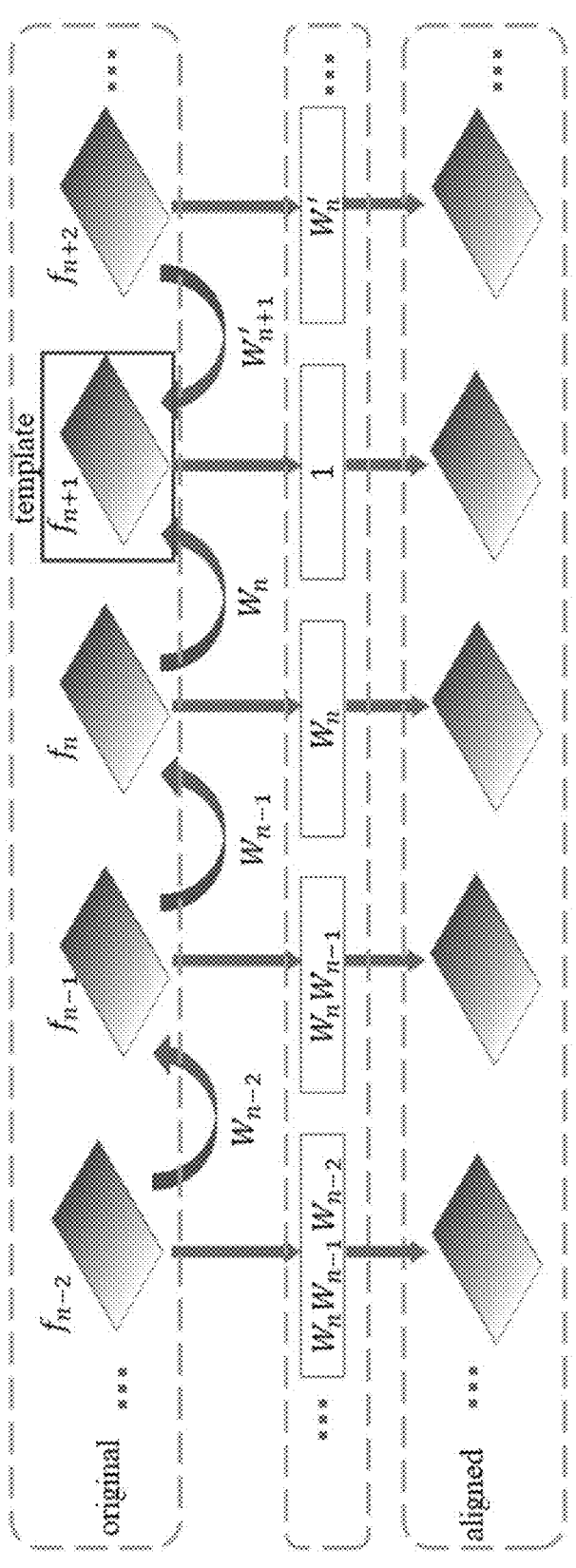
FIG. 12 shows an example phase alignment method in accordance with various aspects of the present disclosure.

As shown in FIG. 12, the recursive alignment procedure from $f_{n-m}$ to $f_{n+1}$ is mathematically described according to the following Equation (16).

$$[X_{n+1}, Y_{n+1}, 1]^T = W_n W_{n-1} \ldots W_{n-m}[x, y, 1]^T \quad (16)$$

After obtaining the affine warp in Equation (16) for each focus setting, the obtained affine warps can be applied to the high-frequency phase map under the corresponding focus setting to generate a new phase map which will be aligned with the template. For each pixel, the bilinear interpolation algorithm is used to compute the phase value of the sub-pixel location indicated by its affine warp in the template high-frequency phase map and the phase value is assigned to the pixel. After running the same procedure for all focus settings, one may obtain aligned high-frequency phase maps under all focus settings that will finally be used to create the all-in-focus high-frequency phase map.

For phase map stitching, the first step is to measure the focus level for each pixel under different focus settings.

Because the projector focus does not change, the pixel-wise fringe contrast y(x, y) computed by Equation (6) may be used as the focus measure. Because this method does not use image gradient, it also works well for texture-less scenes, which may be challenging to comparative examples of texture-based sharpness measure operators. To further increase the sensitivity of this focus measure, one use the high-frequency fringe contrast as the focus measure. The fringe contrast maps also need to be aligned. For each focus setting, one may use the same global warps with the phase map alignment discussed above with regard to the affine warp estimation, and the same procedure discussed above with regard to the aligned phase map generation, to generate an aligned high-frequency fringe contrast map.

With the focus measure, pixels with the largest focus measure value can be directly selected. In comparative examples methods, such an operation may introduce issues because the pixel-wise fringe contrast computation inevitably contains noises and errors, especially in dark regions. To remedy this, a method is here adopted to formulate the stitching problem as maximum a posteriori (MAP) estimation in a multi-label Markov Random Fields (MRF) on a regular 4-connected grid using the fringe contrast map instead of the image intensity. This MAP estimation can be further derived to an energy minimization problem. Given $\mathcal{V}$ as the set of pixels, $\mathcal{N}$ as the neighborhood pixels defined by the 4-connected grid, and $\mathcal{S}$ as the focal stack size, the energy function given by the following Equation (17) may be minimized.

$$E(l) = \sum_{i \in \mathcal{V}} E_i(l_i) + \sum_{(i,j) \in N} E_{i,j}(l_i, l_j) \tag{17}$$

In Equation (17), $l_i$, $l_j \in [0, \mathcal{S}-1]$ are integer numbers representing the labels for pixel $i$ (i.e., $(x_i, y_i)$) and $j$ (i.e., $(x_j, y_j)$). The labels here mean the focus setting indices from which each pixel should be extracted. $l(x, y)$ is the output denoting the index map that minimizes the energy function. Here $l(x_i, y_i)$ is simplified as $l_i$ to represent the label for pixel $i$ whose coordinates are $(x_i, y_i)$. $\lambda$ is a weighting constant balancing the contribution of the two parts. The larger A yields a smoother final index map with more filtering effect.

Equation (17) contains two parts. The first part is a term that can be considered as the maximum likelihood estimation that only considers the focus measure. This part is mathematically modeled on the fringe contrast under each focus setting $\gamma_n$ (i) where $n \in [0, \mathcal{S}-1]$ according to the following Equation (18).

$$E_i(l_i) = e^{-\gamma_{l_i}(i)} \tag{18}$$

The second part considers the prior constraint to make the labels of neighboring pixels smooth. The total variation (TV) operator is used to form this part according to the following Equation (19).

$$E_{i,j}(l_i, l_j) = |l_i - l_j| \tag{19}$$

The energy function in this formulation is large-dimensional and non-convex. The α-expansion algorithm based on the graph cuts method is employed to find the solution.

With the index map l(x, y), a weighted-average phase is computed for each pixel (x, y). The number of different indices within a small window centered at (x, y) in the index map is counted, then the weighted average is computed using the phase values of the pixel with the same coordinates (x, y) under the focus settings specified by the counted indices. The weight is set as the ratio of the counts. This alternative approach can be mathematically described according to the following Equation (20).

$$\hat{\Phi}(x, y) = \frac{\sum_{l \in \mathcal{U}(x,y)} n_l \Phi^l(x, y)}{n_{\mathcal{U}}} \tag{20}$$

In Equation (20), l represents an index inside a small window $\mathcal{U}(x, y)$ centered at pixel (x, y) in the index map, $n_l$ represents the counts of index l, $\Phi^l(x, y)$ represents the aligned high-frequency phase of pixel (x, y) under the focus setting l, and $n_{\mathcal{U}}$ represents the total pixel number of the window $\mathcal{U}(x, y)$.

Once the all-in-focus phase map is created, the 3D shape can be reconstructed if the system is calibrated. When calibrating the system, the focal length of the camera may be set to the same value as the template in the phase alignment algorithm. Because pin-hole lenses are used for both the camera and the projector, the 3D shape can be reconstructed using a phase-to-coordinate conversion algorithm.

Thus, the present disclosure provides systems and methods that can effectively enlarge the DOF of microscopic 3D imaging while preserving high depth resolution. The systems and methods described herein were experimentally verified to achieve a DOF of approximately 2 mm, which was approximately 10 times the DOF of the camera. The system had a FOV of approximately 4 mm×3 mm with a spatial resolution of approximately 2.6 μm.

A large DOF was achieved by using an accurate image alignment method using the phase of projected fringe patterns with modified fringe frequency. Comparing with image intensity, the phase is more robust to surface texture or the camera focus level. Because lower-frequency fringe patterns are less impacted by more camera defocus, the phase maps from lower-frequency fringe patterns were used for image alignment.

The present disclosure provides a high-accuracy phase image stitching method by developing algorithms using both the fringe contrast and the phase information. The focus level may be measured using the aligned high-frequency fringe contrast because it is more sensitive to camera defocus than the lower-frequency fringe contrast. Compared with focus measure operators based on image gradients, the fringe contrast is more robust to texture and camera defocus. To reduce the impact of large fringe contrast noise near the sharp discontinuities and/or dark regions, the aligned high-frequency fringe contrast may be combined with an energy minimization algorithm to obtain a modified index map. The weighted-average phase is computed based on the modified index map for each pixel to create the all-in-focus accurate phase map. Finally, the 3D image of the scene is reconstructed from the all-in-focus phase map. This method successfully enlarged the DOF of the 3D imaging system by approximately 10 times.

Adaptive Focus Stacking with Focal Sweep

The focus stack method 200 described above uses a series of pre-defined focus settings. In the particular implementation described above, the method 200 captures images under all pre-defined focus settings and ignores the characteristics of the measured objects. In some instances, some of these focus settings may not provide any meaningful information. For example, the depth range of the measured objects may be smaller than the maximum DOF after the focus stacking, and/or the geometry of the measured objects may include sharp depth discontinuities. In such situations, the some pre-defined focus settings may be unnecessary because they do not focus the camera on the surface of the measured objects.

Thus, the method 200 may be supplemented with the focal sweep technique to provide an adaptive focus stacking method. The adaptive focus stacking method automatically determines focus settings adapting to different objects instead of using a pre-defined series. The adaptive method first adopts the focal sweep technique to reconstruct an initial 3D point cloud. Though the spatial resolution of this initial 3D point cloud may be lower than a desired resolution, the initial 3D point cloud may be used to determine the effective focus settings that focus the camera on valid areas of the measured objects. Then, fringe images may be captured using only these effective focus settings and a high-quality 3D point cloud may be reconstructed using the focus stacking technique.

Figure 15:
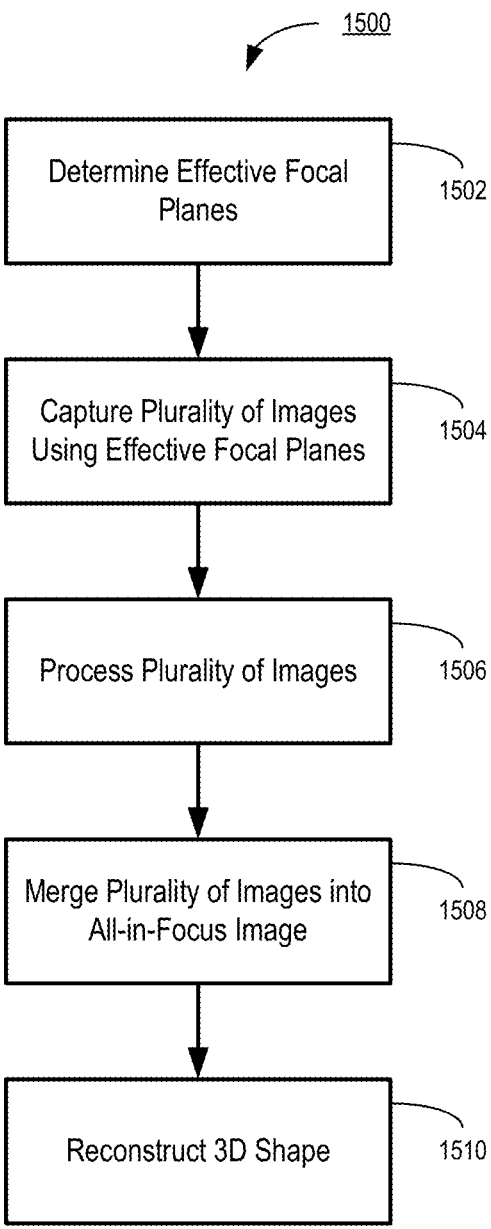
FIG. 15 shows a process flow of an example SL method in accordance with various aspects of the present disclosure.

FIG. 15 illustrates one example of a method 1500 of capturing a 3D image, using an adaptive focus stacking technique which combines focal sweep and focus stacking. For purposes of illustration and explanation, the method 1500 will be described as being performed by the system 100 of FIGS. 1A-1B. For example, the method 1500 may be a series of operations performed by the system 100 under the control of the controller 114.

The method 1500 begins with operation 1502 of determining one or more effective focal planes. Operation 1502 may include capturing a focal sweep image, which is an image captured by changing a focal length of a camera (e.g., the image sensor 112) during a camera exposure process. Operation 1502 may further include generating an initial 3D point cloud based on the focal sweep image. In this regard, operation 1502 may include calculating a maximum depth value of the scene based on the initial 3D point cloud; calculating a minimum depth value of the scene based on the initial 3D point cloud; generating a plurality of preliminary focal plane positions based on the maximum depth value and the minimum depth value; and for each of the plurality of preliminary focal plane positions: comparing an image parameter of the initial 3D point cloud to a threshold, and in response to a determination that the image parameter exceeds the threshold, marking the preliminary focal plane position as one of the plurality of effective focal planes.

Next, at operation 1504, a plurality of images are captured using a plurality of focus settings corresponding to the effective focal planes (and, in implementations, only the effective focal planes) determined at operation 1502. Each of the plurality of images corresponds to one of the plurality of focus settings. Thus, the plurality of images may be referred to as a focal stack. Operation 1504 may include a sub-operation of changing a focal length of a camera (e.g., of the image sensor 112 and/or a component of the second optical system 110, such as an ETL) to capture multi-focus images; and/or a sub-operation of capturing, by the camera (e.g., by the image sensor 112), the plurality of images with different frequencies. The plurality of images may be fringe images.

At operation 1506, the method 1500 processes the plurality of images. Operation 1506 may include a sub-operation of computing a high-frequency phase map and a lower-frequency phase map for respective ones of the plurality of images; a sub-operation of estimating, using the lower-frequency phase map, affine warps that minimize a phase difference between different focus settings of the camera; a sub-operation of applying the affine warps to the high-frequency phase map to generate an aligned fringe contrast map; and a sub-operation of measuring, using the aligned fringe contrast map, a focus level for a plurality of pixels of an image sensor of the camera.

At operation 1508, the method 1500 merges the plurality of images into an all-in-focus image (e.g., an all-in-focus phase map). Operation 1508 may include stitching the high-frequency phase maps for each of the plurality of images into the all-in-focus phase map using the aligned fringe contrast map based on the measured focus levels. Operation 1508 may be followed by operation 1510 of reconstructing a 3D shape of the scene based on the all-in-focus phase map.

Figures 16, 17:
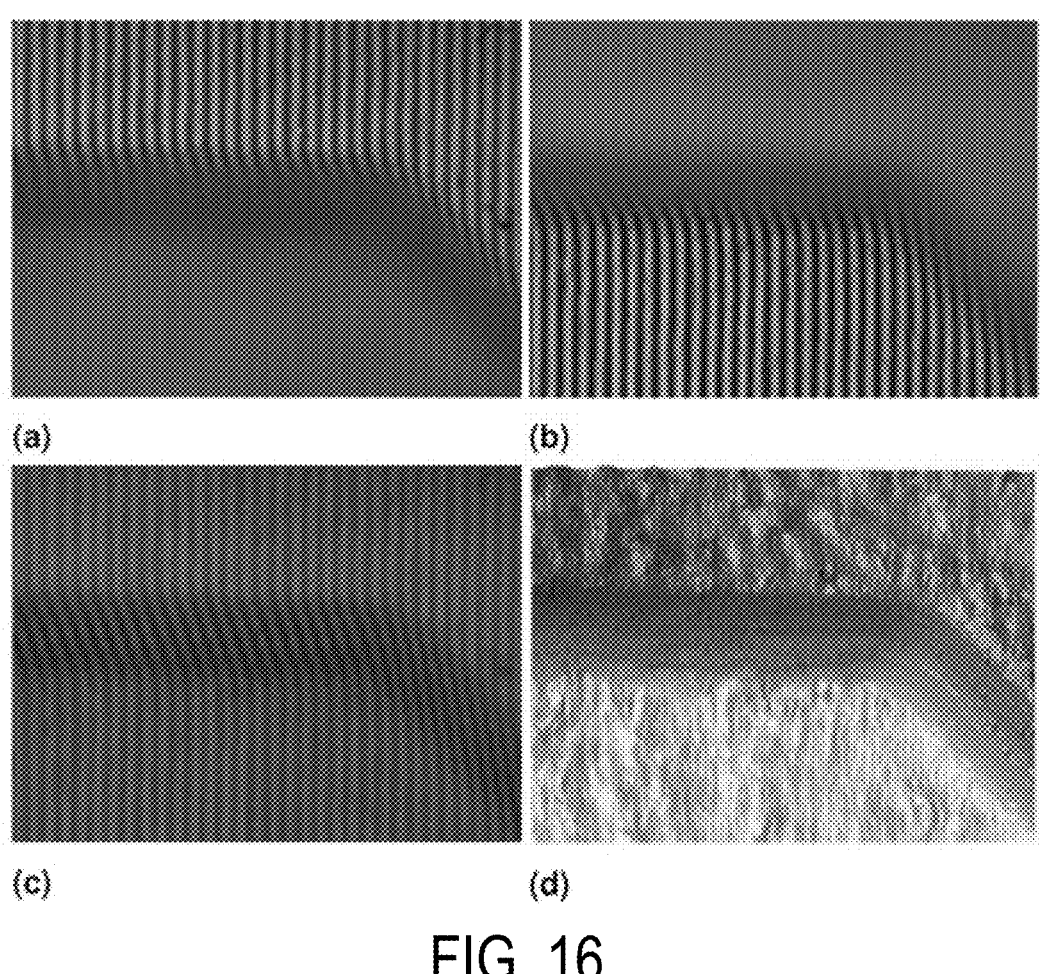
FIG. 16 shows an example of a focal sweep measurement in accordance with various aspects of the present disclosure.
FIG. 17 shows an example of a relationship between focal plane positions and driving current in accordance with various aspects of the present disclosure.

In cases where the original DOF of the microscopic SL 3D imaging system is limited, the camera may be unable to capture complete fringe patterns when the depth range of the measured object exceeds the camera DOF using comparative methods. FIG. 16 presents examples to illustrate this. In FIG. 16, images (a) and (b) respectively represent a captured high-frequency fringe image at two different focus settings. Image (c) represents one of the high-frequency fringe images using the focal sweep technique.

In order to reconstruct the initial ("rough") 3D point cloud of the measured objects, the focal sweep technique is first adopted to enlarge the camera DOF. The focal sweep technique may be implemented using an ETL or other optical component to provide a range of focal lengths without mechanical motion. The focal sweep technique drives the ETL using a triangular wave during the camera exposure process to generate an integrated camera PSF according to the following Equation (21).

$$h(x, y) = \int_{\sigma_l}^{\sigma_h} \frac{1}{2\pi\sigma^2} e^{-\frac{x^2+y^2}{2\sigma^2}} d\sigma + \int_{\sigma_h}^{\sigma_l} \frac{1}{2\pi\sigma^2} e^{-\frac{x^2+y^2}{2\sigma^2}} d\sigma \quad (21)$$

Image (b) of FIG. 16 shows an example of the captured fringe images where the focal sweep is applied. Because the integrated PSF (IPSF) is depth-invariant and the imaging process can be modeled as a convolution process with the IPSF, the captured images may be deblurred one-by-one using deconvolution algorithms, such as the Wiener deconvolution. Image (c) of FIG. 16 shows the deblurred result of this example. The images of FIG. 16 were captured with three different fringe periods, and the three-frequency phase unwrapping algorithm described above was used to obtain the unwrapped phase map. The initial 3D point cloud shown in image (d) can be reconstructed using the phase-shifting algorithm described above with regard to Equations (1) to (6) on the focal sweep image.

In order to analyze the initial 3D point cloud, the relationship between the focus settings and the corresponding camera focal plane positions should be known or determined. This may be referred to as calibrating the focal plane position. To so calibrate, the relationship between the ETL driving currents and the corresponding focal planes may be modeled as a polynomial function, which can be mathematically described according to the following Equation (22).

$$\tilde{i} = \sum_{n=0}^{2} c_n [z_f(i)]^n \quad (22)$$

In Equation (22), $z_f(i)$ represents the camera focal plane position under the ETL current i, and $c_n$ is the polynomial coefficient.

The polynomial coefficients may calibrated by placing a flat surface with some textures perpendicular to the z-axis at several depth positions. At each position, the ETL current that best focuses the flat plane may be estimated. To realize this, texture images may be captured under several sampled ETL currents and blur levels of the images may be computed using an algorithm. FIG. 17 shows the calibrated relationship of the focal plane positions vs. the ETL driving current. Graph (a) shows the relationship between the ETL current and the image blur level when the object was placed at a particular static depth. The blue dots shown in graph (a) of FIG. 17 correspond to the sampled ETL currents. The minimum value in graph (a) represents the ETL current that focuses the camera on this depth. A two-term Gaussian model may be used to fit using these points according to the following Equation (23).

$$\mathcal{B}(i) = \sum_{j=1}^{2} a_j e^{-\frac{(i-\mu_j)^2}{\sigma_j^2}} \tag{23}$$

In Equation (23), B(i) represents the blur level fo the captured image under ETL driving current i. The ETL current corresponding to the focus may be estimated by finding the minimum of the Gaussian model, shown as the dashed line in graph (a) of FIG. 17. Once this ETL current was determined, three-frequency phase-shifted patterns may be projected and fringe images are captured under the determined ETL current to reconstruct the 3D point cloud of the plane using the three-frequency phase unwrapping algorithm. The z-coordinate of the reconstructed plane is averaged as the approximate focal plane position. The polynomial coefficients of Equation (22) may then be fitted using the focal plane positions estimated for all depths and the corresponding determined ETL currents, as shown in graph (b) of FIG. 17 in this example.

Once the relationship between the focus settings and the focal plane positions is obtained, several discrete focus settings can be computed through the depth values (i.e., z-coordinates) of the initial 3D point cloud to ensure that each of these discrete focus settings will focus the camera on the measured objects. These discrete focus settings are referred to as "effective focus settings." The effective focus settings can be computed after finding the effective focal plane positions in the following three steps.

In the first step, the maximum and minimum depth values of the measured object may be determined from the initial 3D point cloud according to the following Equations (24) and (25).

$$z_{max} = \max\{z(x, y) \mid (x, y) \in \mathcal{V}\} \tag{24}$$

$$z_{min} = \min\{z(x, y) \mid (x, y) \in \mathcal{V}\} \tag{25}$$

In Equations (24) and (25), z(x, y) is the z-coordinate of the pixel (x,y) and V represents the set composed of all pixels.

In the second step, a new series of preliminary focal plane positions is created with a certain step size of $\Delta z$ mm starting from $$z'_{max} = z_{max} - \Delta z / 2 \ (\text{or } z'_{min} = z_{min} + \Delta z / 2).$$

The step size $\Delta z$ may be selected to be equal to the camera DOF provided by a single focus setting. To simplify the algorithm, it can be assumed that the camera DOF provided by different focus settings is always a constant number so that there is no need to consider its change, and that the DOF is symmetric to the focal plane position such that each focus setting can focus the camera within the range of $z_f \pm \Delta z / 2$ where z is the corresponding focal plane position. Each element of the series is computed by iteratively decreasing by an amount $\Delta z$ from the previous element, starting at $z_{max}$. The last element of the preliminary focal plane positions may not be equal to $$z'_{min}$$

because it is not necessarily the case that $$z'_{max} - z'_{min}$$

is an integer multiple of the step size $\Delta z$. Therefore, the iteration may be stopped upon reaching a new element $z_m$ that is smaller than $$z'_{min} + \Delta z.$$

Then, $$z'_{min}$$

can be checked to see whether it has been covered by $z_m$ to determine whether $$z'_{min}$$

should be used as the effective focal position. This is represented by the following Equation (26).

$$z_{end} = \begin{cases} z'_{min}, & z_m - z'_{min} \geq \dfrac{\Delta z}{2} \\ z_m, & z_m - z'_{min} < \dfrac{\Delta z}{2} \end{cases} \tag{26}$$

Figure 18:
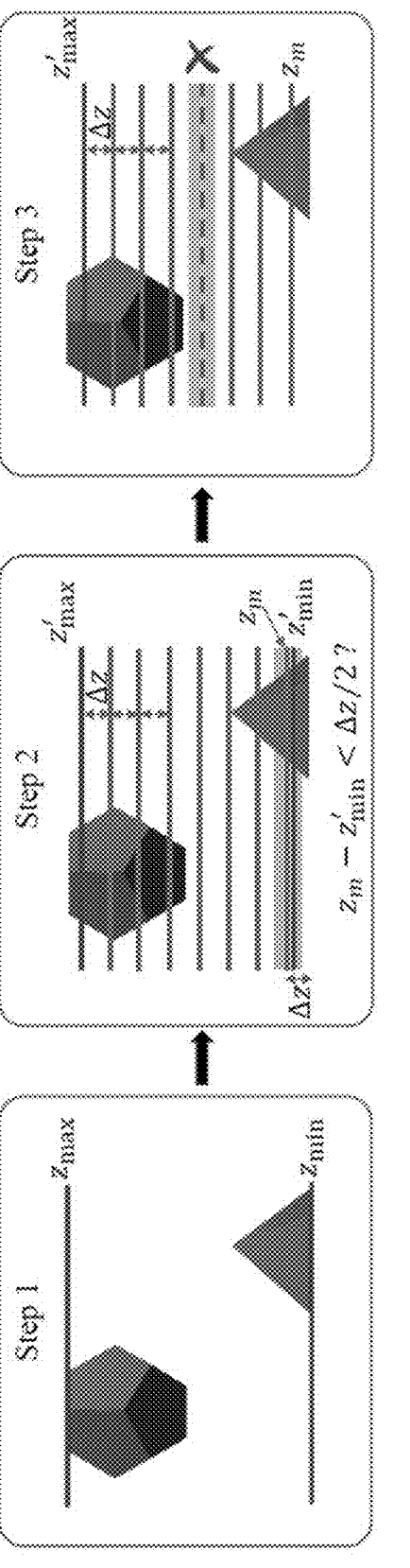
FIG. 18 shows a workflow of an example method of determining effective focal planes in accordance with various aspects of the present disclosure.

In the third step, each preliminary focal plane position is checked to determine whether it is effective. The number of pixels in the initial 3D point cloud located within the effective range (i.e., $\Delta z$) of each preliminary focal plane is counted, and the preliminary focal plane is marked as effective if the number is larger than a threshold. In the example described here, the threshold is set as 100 pixels. Those preliminary focal plane positions that are not marked as effective may be deleted after all pixels are compared. This overall process is visualized in FIG. 18. Once the effective focal plane positions are determined, the effective focus settings are computed using Equation (22).

Figure 19:
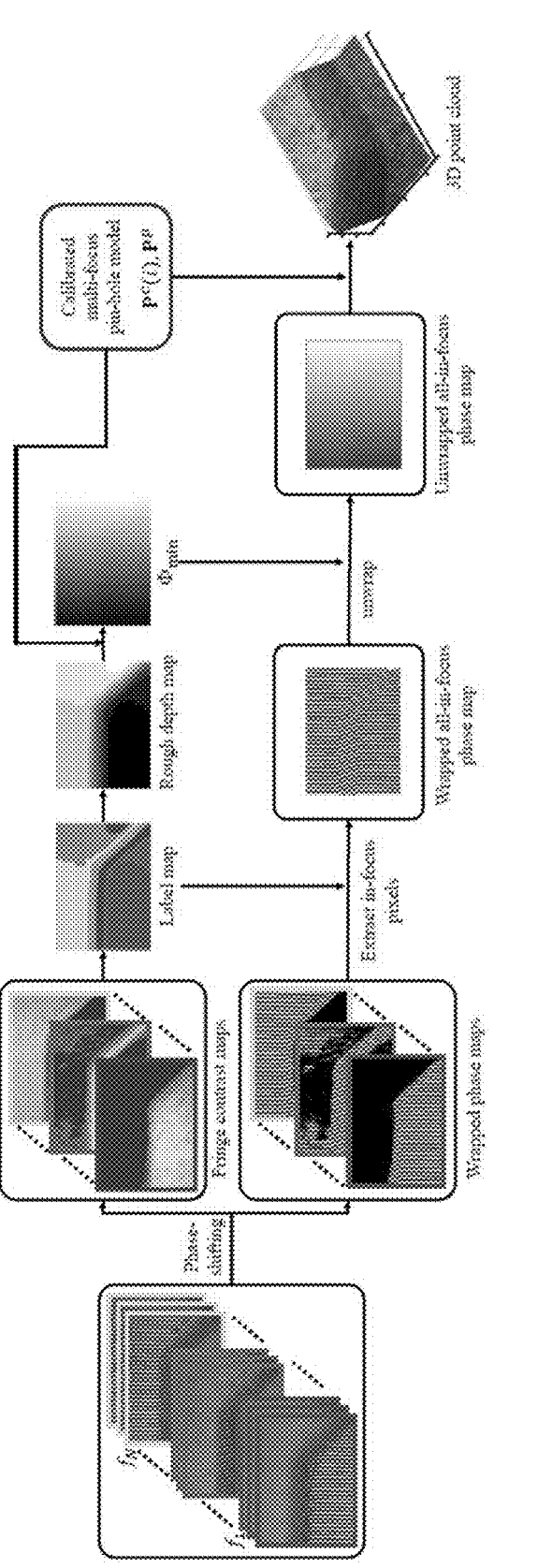
FIG. 19 shows a workflow of an example focus stacking method in accordance with various aspects of the present disclosure.

After the effective focus settings are determined, fringe images can be captured under these effective focus settings and the focus stacking technique described above may be used to reconstruct a high-quality ("fine") 3D point cloud with a large DOF. This overall process is summarized in FIG. 19. In particular, fringe images are first captured under effective focus settings. Then, the phase-shifting algorithm described above is run under each focus setting to obtain wrapped phase maps and fringe contrast maps (see Equation (6)). Then, the fringe contrast maps are further used to extract in-focus pixels, for example based on the energy minimization algorithm described above, to compute a pixel-wise label map/which minimizes the following Equation (27).

$$E(l) = \sum_{p \in V} E(l_p) + \lambda \sum_{(p,q) \in C} E_{p,q}(l_p, l_q) \qquad (27)$$

In Equation (27), $\sum_{p \in v} E(l_p)$ represents the total blur level of all camera pixels V. For any pixel p, its blur level can be measured by the following Equation (28).

$$E(l_p) = e^{-\gamma_{l_i}(p;l_p)} \qquad (28)$$

In Equation (28), $\gamma(p; l_p)$ is the fringe contrast that can be obtained by Equation (6) above. The term $\sum_{(p,q) \in} E \, E(l_p, l_q)$ is a regularization term to measure the smoothness of the label map. For any pixel p, each adjacent pixel q along its horizontal directions (marked as $(p,q) \in C$) is used to quantify its smoothness as the following Equation (29).

$$E(l_p, l_q) = |l_p - l_q| \qquad (29)$$

The term $\lambda$ in Equation (27) is a constant to balance the blur measure and the smoothness constraint.

The $\alpha$-expansion algorithm was used to solve Equation (27). The label map indicates the focus setting of each in-focus pixel. Therefore, phase values of in-focus pixels are extracted from the wrapped phase maps under corresponding focus settings. In parallel, an initial (rough) depth map may be estimated using Equation (22). The rough depth value of each in-focus pixel can be used to unwrap the phase of the pixel using the geometric-constraint phase unwrapping algorithm described above. Finally, the 3D coordinates of each in-focus pixel can be computed with the unwrapped phase map and the calibrated multi-focus pin-hole model.

The performance of the method 1500 was experimentally verified using the prototype system shown in FIG. 1B, the details of which are described above with regard to the method 200. However, for this verification, the camera resolution was instead set as 1600×1200 pixels. For the focus stacking operation, only the 9-step highest-frequency (i.e., a step of 18 pixels) vertical fringe patterns were used. The ETL was driven with a 100 Hz triangular wave to implement the focal sweet technique. The projector exposure time was set as 9.7 ms. The step size for generating the preliminary focus settings was set as 150 μm (i.e., $\Delta z=150$ μm) and the regularization weight was set as 0.15 (i.e., $\lambda=0.15$).

Figure 20:
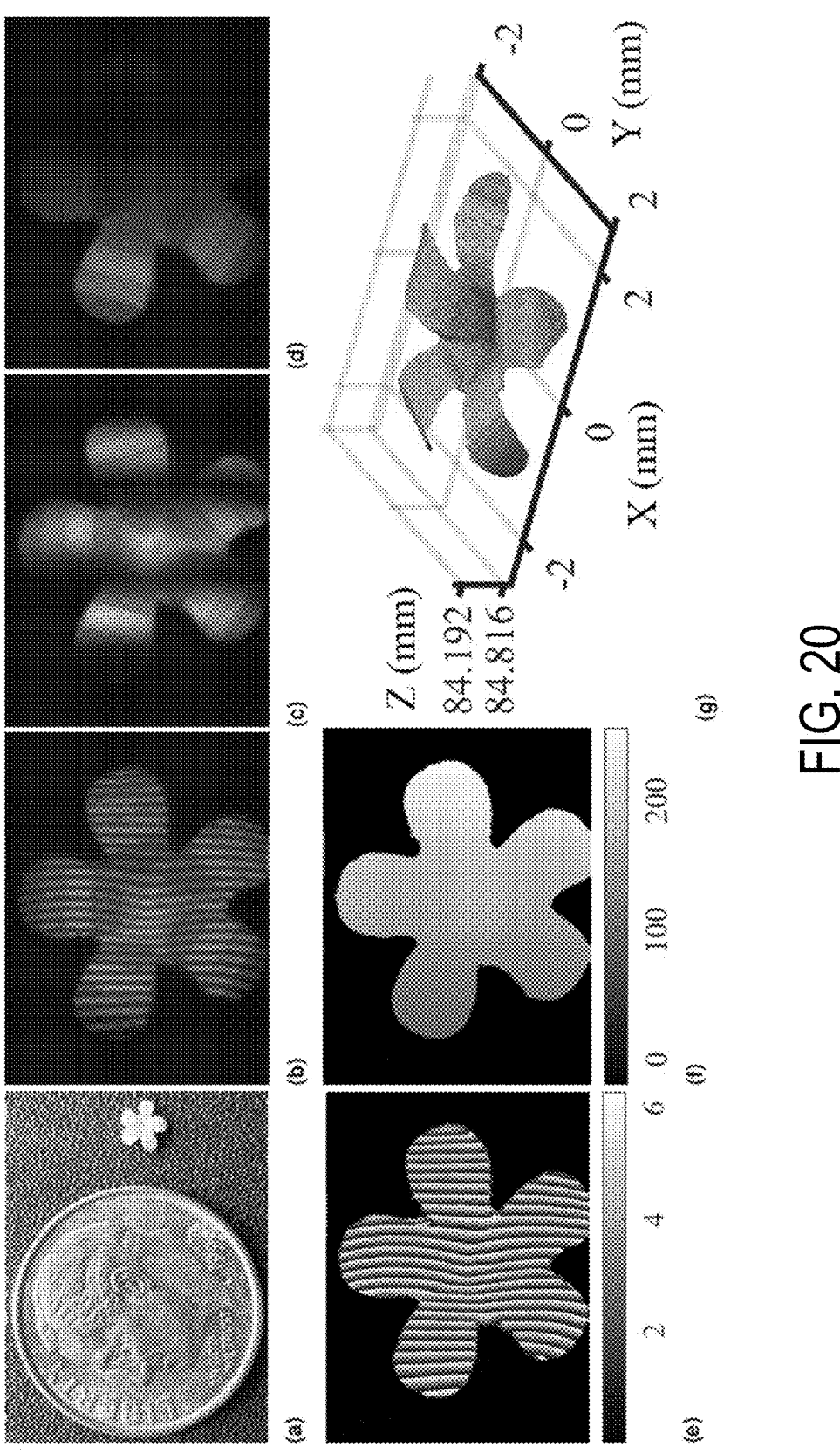
FIG. 20 shows example experimental results for a rough 3D measurement in accordance with various aspects of the present disclosure.

A 3D-printed object with a complex surface geometry was first used to evaluate the performance of the method 1500. FIG. 20 shows experimental results of the rough 3D measurement using the focal sweet technique. Image (a) is a photograph of the sample next to a dime for scale. Images (b)-(d) are example fringe images with three different frequencies using focal sweep and image deblurring. Image (c) is the wrapped phase map, and image (f) is the unwrapped phase map. Graph (g) shows the rough 3D point cloud.

Figure 21:
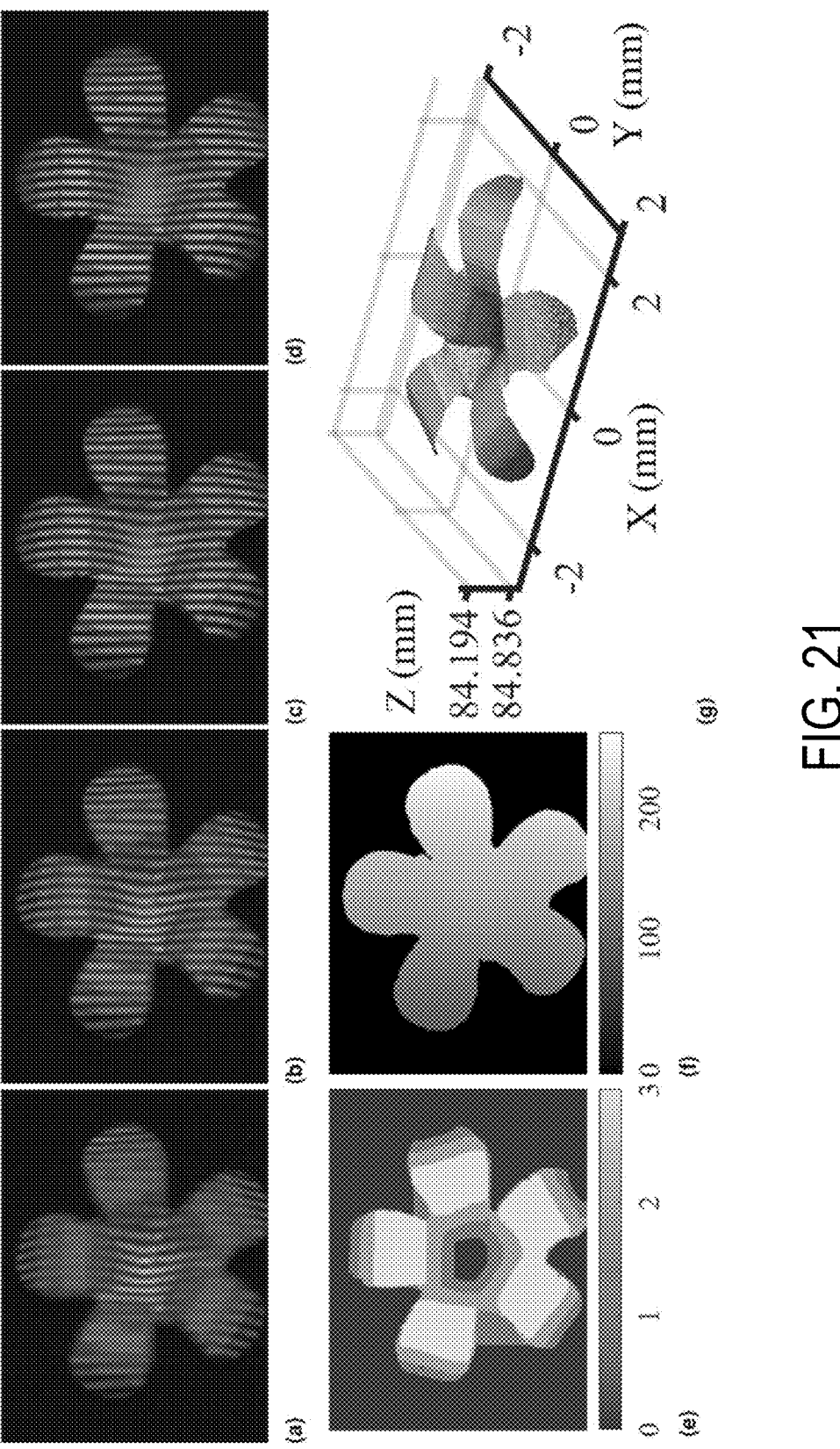
FIG. 21 shows example experimental results for a fine 3D measurement in accordance with various aspects of the present disclosure.

Once the rough 3D point cloud was obtained, four effective focus settings (i.e., −134.53 mA, −131.41 mA, −128.29 mA, and −125.49 mA) were detected using the method described above. Then, projection using high-frequency fringe patterns and fringe image capture was performed only under these effective focus settings. FIG. 21 shows experimental results of the high-quality 3D reconstruction by focus stacking using the four detected effective focus settings. In FIG. 21, images (a)-(d) are the captured high-frequency fringe images under the above effective focus settings in the listed order. These fringe images demonstrate that all effective focus settings focused the camera on valid areas of the measured object. Image (e) is the label map generated using fringe contrast maps under all effective focus settings, using the focus stacking method described above, and indicates the focus setting index of each in-focus pixel. The in-focus pixels were extracted following the label map, and their phase was unwrapped using the ETL-assisted phase unwrapping technique to obtain an in-focus unwrapped phase map. Image (f) is the in-focus unwrapped phase map formed by in-focus pixels from all effective focus settings. Graph (g) shows the high-quality 3D point cloud, reconstructed using the in-focus unwrapped phase map.

Figure 22:
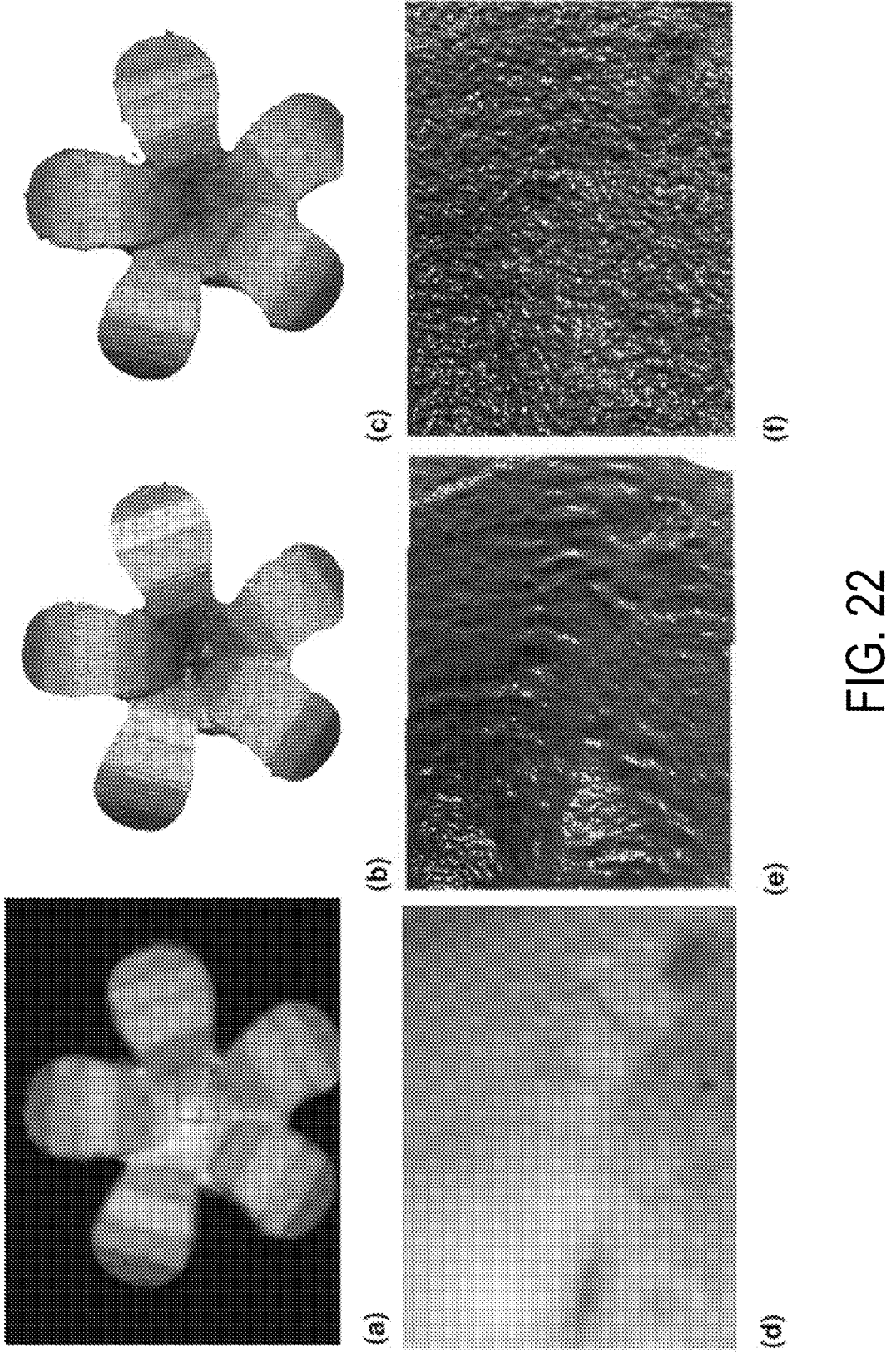
FIG. 22 shows an example comparison of point cloud resolution between various techniques in accordance with various aspects of the present disclosure.

Compared with the rough 3D point cloud reconstructed with the focal sweep technique, the high-quality 3D point cloud has a higher resolution. This is shown in FIG. 22, which is a comparison of the two point cloud maps. Image (a) is a texture image. Image (b) is the 3D point cloud reconstructed by focus stacking. Image (c) is the rough 3D point cloud reconstructed using focal sweep. Images (d)-(f) are zoomed-in views of images (a)-(c), corresponding to the rectangle shown in image (a). The zoomed-in view of images (c) and (f) further demonstrate that small features on the object surface were better preserved in the high-quality 3D point cloud than in the rough 3D measurement.

Figure 23:
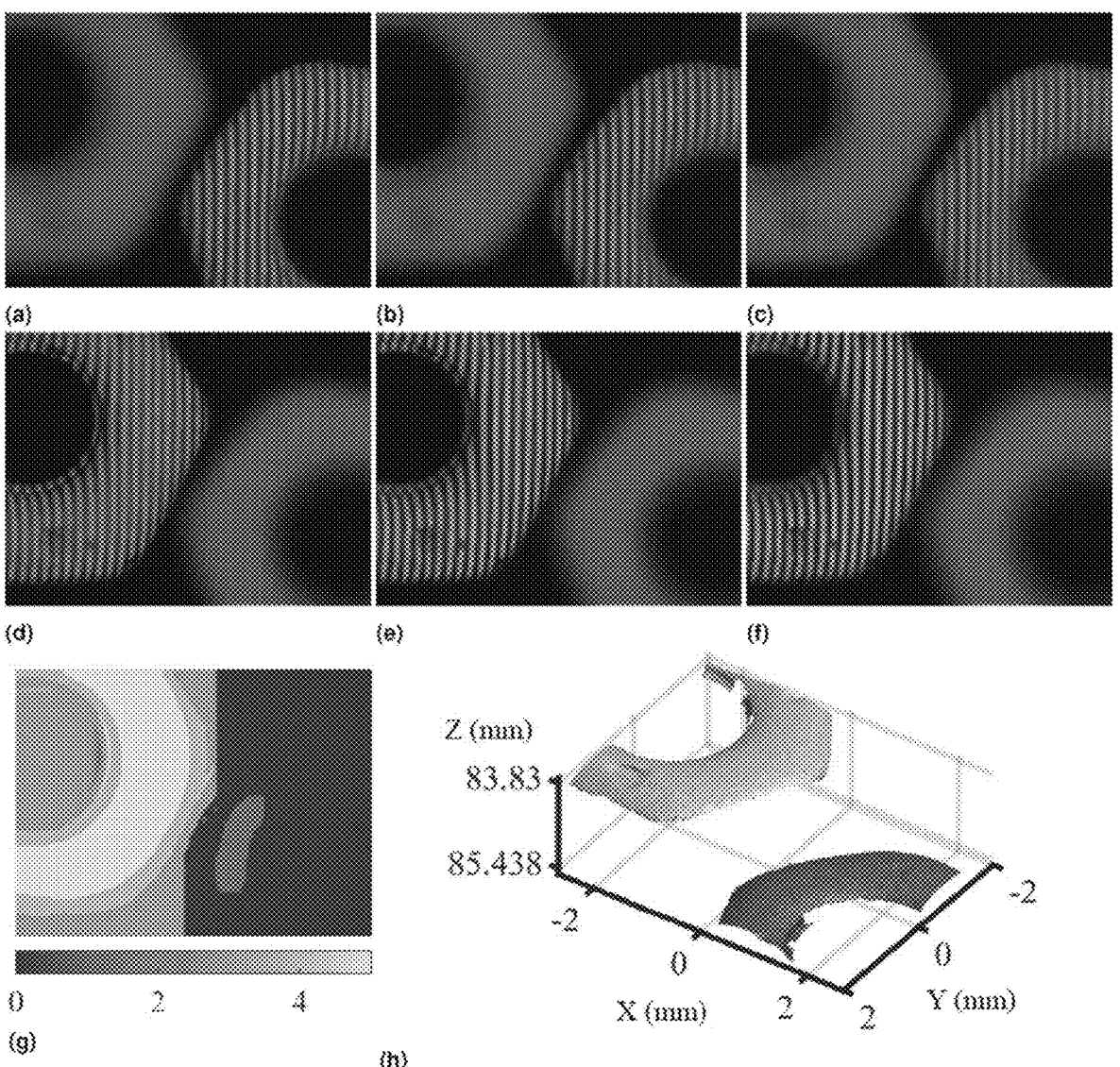
FIG. 23 shows example experimental results for a scene measurement in accordance with various aspects of the present disclosure.

To further evaluate the method 1500, a scenario with sharp discontinuities was measured. In this scenario, two M2 nuts were placed on different heights to create a sharp depth discontinuity. Following the same procedure described above, six effective focus settings were detected (i.e., −144.24 mA, −141.13 mA, −138.02 mA, −122.40 mA, −119.27 mA, and −116.13 mA). FIG. 23 shows the experimental results of this evaluation. Images (a)-(f) show the captured high-frequency fringe images under the six effective focus settings, in the above-listed order. The fringe images and the detected ETL currents demonstrate that the method 1500 successfully detected the large void in depth between the two nuts and created a quick change in effective focus settings (i.e., from −138.02 mA to −122.40 mA). Image (g) of FIG. 23 shows the label map generated by the focus stacking, and graph (h) shows the final 3D point cloud reconstructed using the effective focus settings.

The method 1500 provides an adaptive focus stacking method as an alternative approach for acquiring focal stacks in large DOF 3D imaging. The method 1500 can automatically determine effective focus settings for measured objects, thus avoiding capturing images under unnecessary focus settings. Because the imaging speed depends on the number of used focus settings, the method 1500 may result in improved imaging speed for large DOF 3D measurements in some situations, compared to the method 200. Generally, the method 1500 will provide increased speed if the object only has a smaller depth range than the maximum DOF provided by the focus stacking (see the example of FIGS. 21 and 22), and/or if the object has sharp depth discontinuities despite a large overall depth (see the example of FIG. 23). However, because the initial rough 3D measurement takes time, in some instances (e.g., if the object has a depth range close to the maximum DOF provided by the focus stacking and/or if the object does not have sharp depth discontinuities) the method 200 may be faster.

In the above example, 15 fringe images were captured for the initial rough 3D measurement. The time cost is slightly less than the time for capturing fringe images under two focus settings (i.e., 18 fringe images) during the focus stacking. Therefore, supposing that the depth range covered by a single focus setting is $\Delta z$ and the maximum DOF provided by the focus stacking is $\mathcal{D}$, the method 1500 will be faster if the valid depth range of the measured objects is smaller than $\mathcal{D} - 2\Delta z$. Otherwise, the method 200 will be faster.

Other examples and uses of the disclosed technology will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

What is claimed is:

1. A method of capturing a three-dimensional (3D) image, the method comprising:
    capturing a plurality of images of a scene using a plurality of focus settings, each of the plurality of images corresponding to one of the plurality of focus settings, the plurality of images corresponding to a focal stack, wherein the operation of capturing includes capturing, by a camera, a plurality of fringe images with different frequencies;
    processing the plurality of images, wherein the operation of processing includes:
        computing a high-frequency phase map and a lower-frequency phase map for respective ones of the plurality of fringe images,
        estimating, using the lower-frequency phase map, affine warps that minimize a phase difference between different focus settings of the camera,
        applying the affine warps to the high-frequency phase map to generate an aligned fringe contrast map, and
        measuring, using the aligned fringe contrast map, a focus level for a plurality of pixels of an image sensor of the camera;
    merging the plurality of images into an all-in-focus phase map; and
    reconstructing a 3D shape of the scene based on the all-in-focus phase map.

2. The method of claim 1, wherein the operation of capturing includes changing a focal length of the camera to capture multi-focus images.

3. The method of claim 2, wherein the camera includes an electrically tunable lens (ETL) that allows for capturing the multi-focus images without mechanical motion.

4. The method of claim 1, wherein the operation of merging includes stitching the high-frequency phase maps for each of the plurality of images into the all-in-focus phase map using the aligned fringe contrast map based on the measured focus levels.

5. The method of claim 1, further comprising determining a plurality of effective focal planes, wherein in the operation of capturing, the plurality of focus settings correspond to the plurality of effective focal planes.

6. The method of claim 5, further comprising capturing a focal sweep image, including changing a focal length of the camera during a camera exposure process.

7. The method of claim 6, further comprising generating an initial 3D point cloud based on the focal sweep image.

8. The method of claim 7, wherein the operation of determining includes:
    calculating a maximum depth value of the scene based on the initial 3D point cloud;
    calculating a minimum depth value of the scene based on the initial 3D point cloud;
    generating a plurality of preliminary focal plane positions based on the maximum depth value and the minimum depth value; and
    for each of the plurality of preliminary focal plane positions:
        comparing an image parameter of the initial 3D point cloud to a threshold, and
        in response to a determination that the image parameter exceeds the threshold, marking the preliminary focal plane position as one of the plurality of effective focal planes.

9. The method of claim 8, wherein each of the plurality of focus settings corresponds to one of the plurality of effective focal planes.

10. The method of claim 1, wherein the operation of capturing the plurality of fringe images includes capturing, by the camera, a plurality of vertical fringe images with different frequencies and a plurality of horizontal fringe images with different frequencies.

11. An imaging system, comprising:
    a projector configured to emit a projection light;
    a first optical system configured to direct the projection light from the projector to a stage on which an imaging target is located;
    an image sensor configured to receive an imaging light;
    a second optical system configured to direct the imaging light from the stage to the image sensor; and
    a controller configured to cause the system to perform operations comprising:
        capturing a plurality of images of the imaging target using a plurality of focus settings, each of the plurality of images corresponding to one of the plurality of focus settings, the plurality of images corresponding to a focal stack, wherein the operation of capturing includes capturing, by the image sensor, a plurality of fringe images with different frequencies,
        processing the plurality of images, wherein the operation of processing includes:
            computing a high-frequency phase map and a lower-frequency phase map for respective ones of the plurality of fringe images, estimating, using the lower-frequency phase map, affine warps that minimize a phase difference between different focus settings of the image sensor, applying the affine warps to the high-frequency phase map to generate an aligned fringe contrast map, and measuring, using the aligned fringe contrast map, a focus level for a plurality of pixels of the image sensor, merging the plurality of images into an all-in-focus phase map, and reconstructing a three-dimensional (3D) shape of the imaging target based on the all-in-focus phase map.

12. The system of claim 11, wherein the controller includes a processor and a non-transitory computer-readable medium storing instructions that, when executed by the processor, cause the system to perform the operations.

13. The system of claim 11, wherein the second optical system includes an electrically tunable lens (ETL) configured to capture multi-focus images without mechanical motion.

14. The system of claim 11, wherein the operation of capturing includes changing a focal length of the image sensor to capture multi-focus images.

15. The system of claim 11, wherein the operation of merging includes stitching the high-frequency phase maps for each of the plurality of images into the all-in-focus phase map using the aligned fringe contrast map based on the measured focus levels.

16. The system of claim 11, the operations further comprising capturing a focal sweep image, including changing a focal length of the image sensor during an image sensor exposure process.

17. The system of claim 16, the operations further comprising generating an initial 3D point cloud based on the focal sweep image.

18. The system of claim 17, further comprising determining a plurality of effective focal planes, wherein in the operation of capturing, the plurality of focus settings correspond to the plurality of effective focal planes, wherein the operation of determining includes:

calculating a maximum depth value of the imaging target based on the initial 3D point cloud;

calculating a minimum depth value of the imaging target based on the initial 3D point cloud;

generating a plurality of preliminary focal plane positions based on the maximum depth value and the minimum depth value; and for each of the plurality of preliminary focal plane positions:

comparing an image parameter of the initial 3D point cloud to a threshold, and in response to a determination that the image parameter exceeds the threshold, marking the preliminary focal plane position as one of the plurality of effective focal planes.

19. The system of claim 18, wherein each of the plurality of focus settings corresponds to one of the plurality of effective focal planes.

20. The system of claim 11, wherein the operation of capturing the plurality of fringe images includes capturing, by the image sensor, a plurality of vertical fringe images with different frequencies and a plurality of horizontal fringe images with different frequencies.

* * * * *